Dec. 6, 1960   M. ORLANDO ET AL   2,962,844
MACHINE FOR MAKING DRY CELLS
Filed Oct. 14, 1955   19 Sheets-Sheet 2

INVENTORS
MATTHEW ORLANDO
LEONARD SCHUB
BY
ATTORNEYS

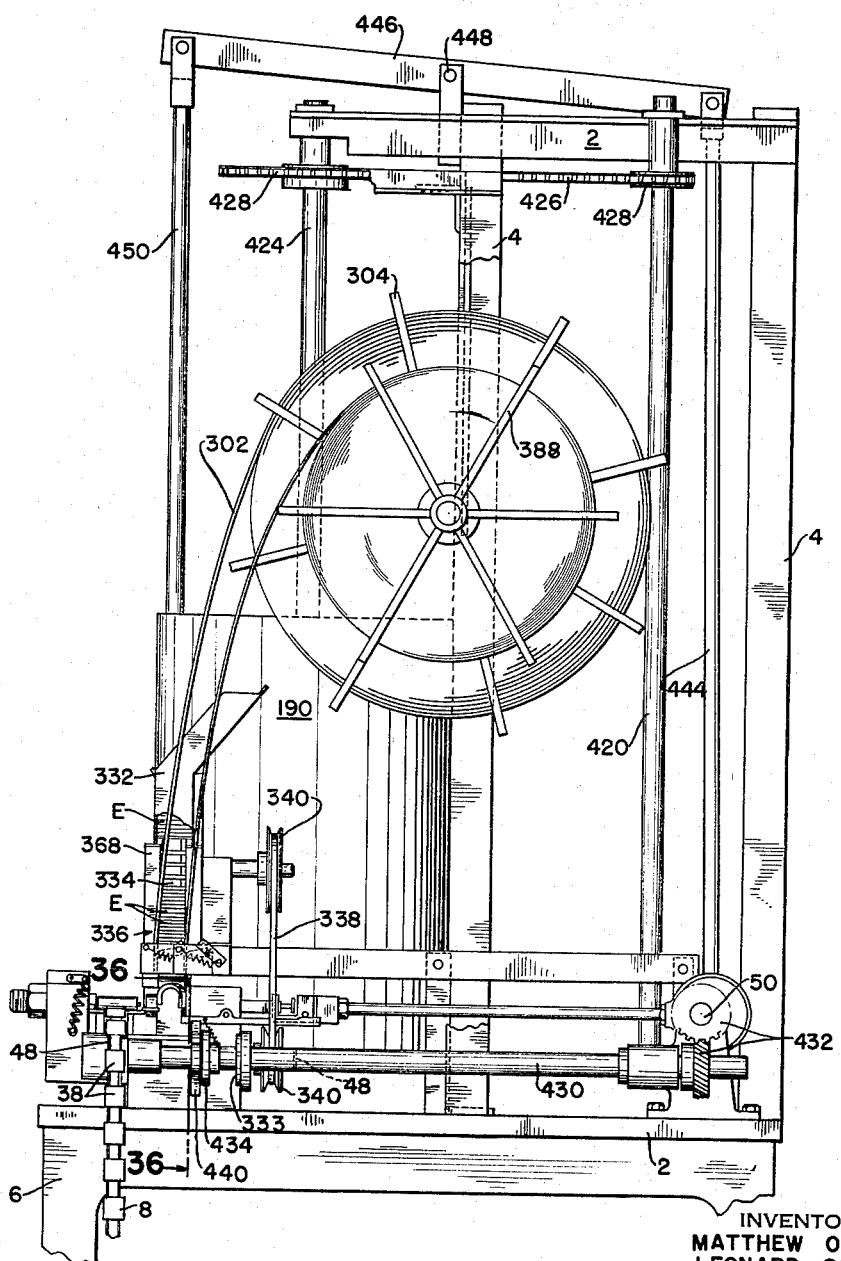

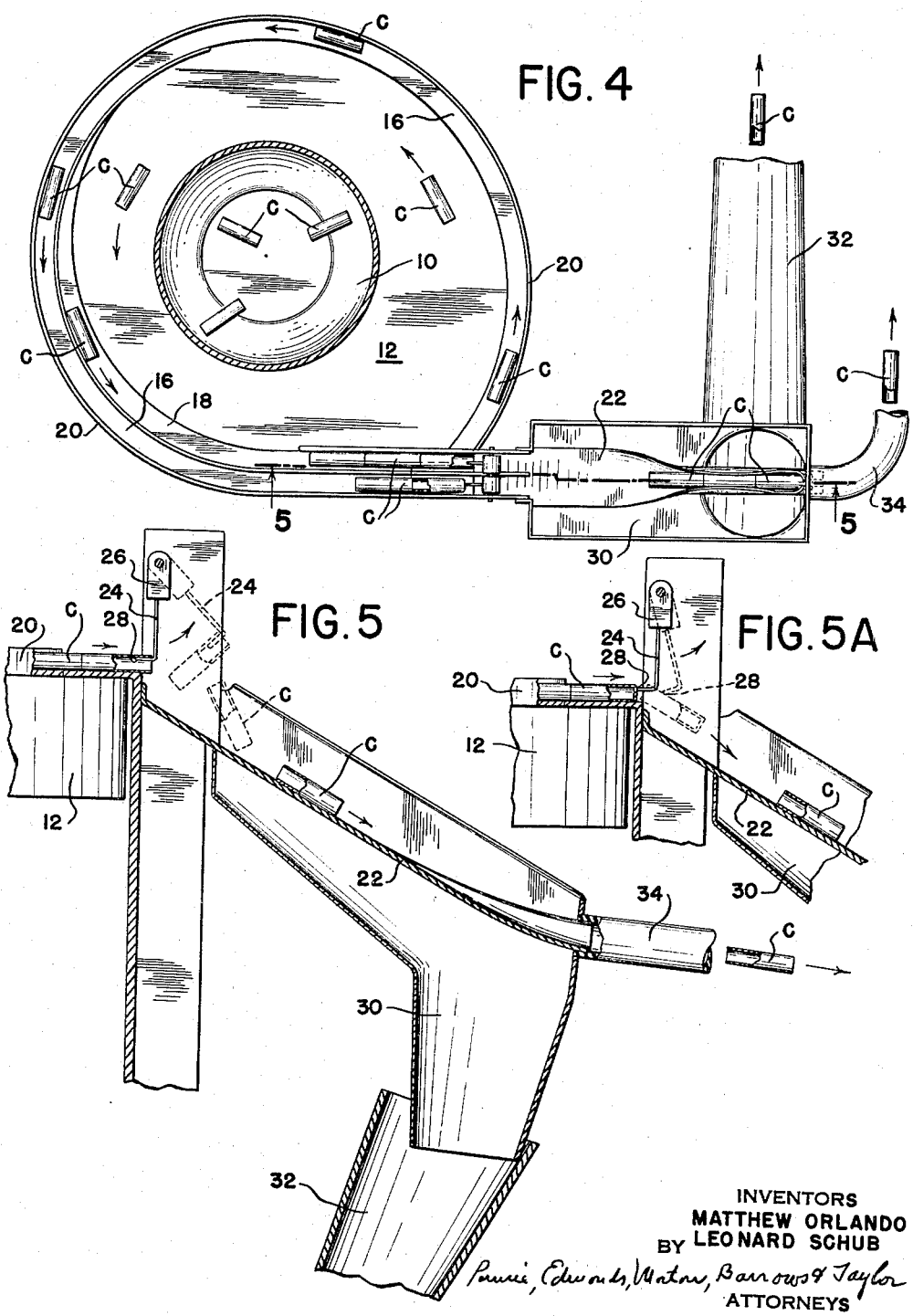

Dec. 6, 1960
M. ORLANDO ET AL
2,962,844
MACHINE FOR MAKING DRY CELLS
Filed Oct. 14, 1955
19 Sheets-Sheet 5
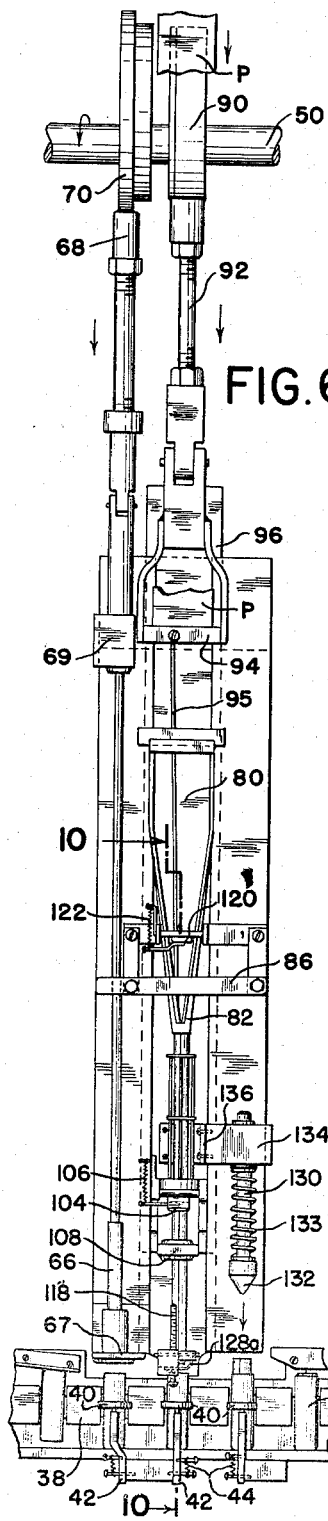
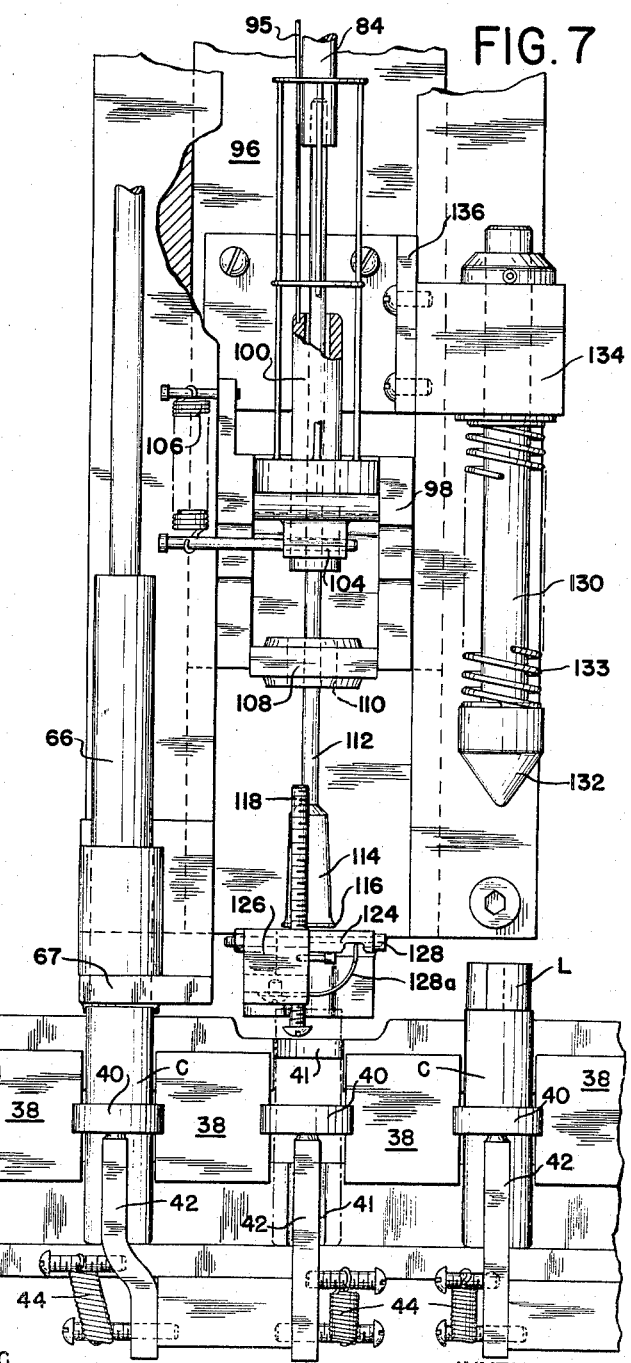
INVENTORS
MATTHEW ORLANDO
LEONARD SCHUB
BY Pennie, Edmonds, Morton, Barrows & Taylor
ATTORNEYS Dec. 6, 1960   M. ORLANDO ET AL   2,962,844
MACHINE FOR MAKING DRY CELLS
Filed Oct. 14, 1955   19 Sheets-Sheet 6
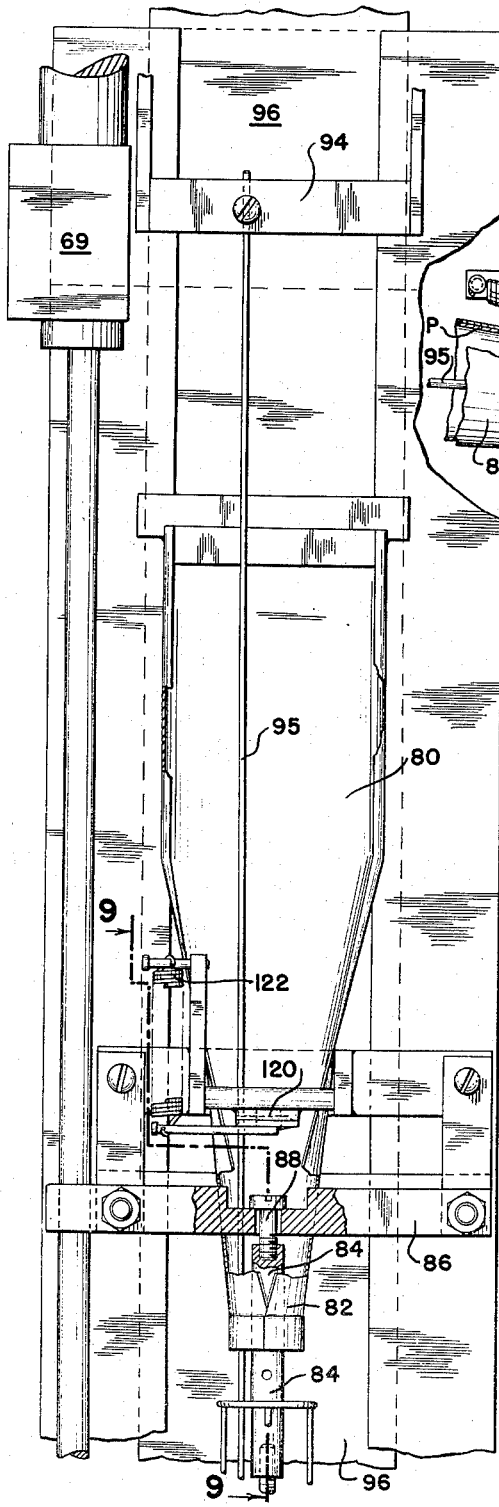
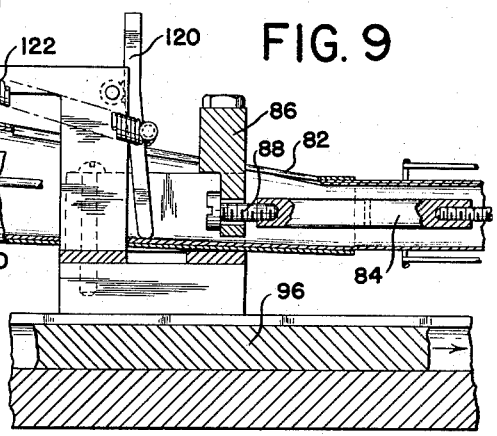
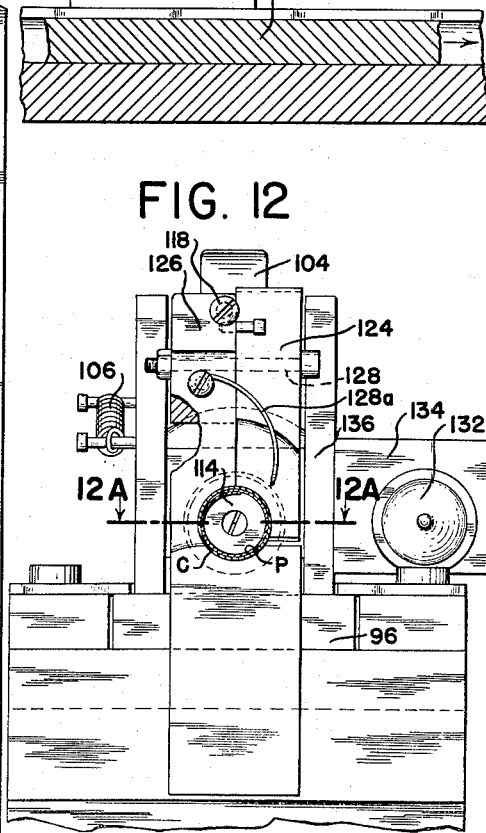
INVENTORS
MATTHEW ORLANDO
LEONARD SCHUB
BY Pennie, Edmonds, Morton, Barrows & Taylor
ATTORNEYS

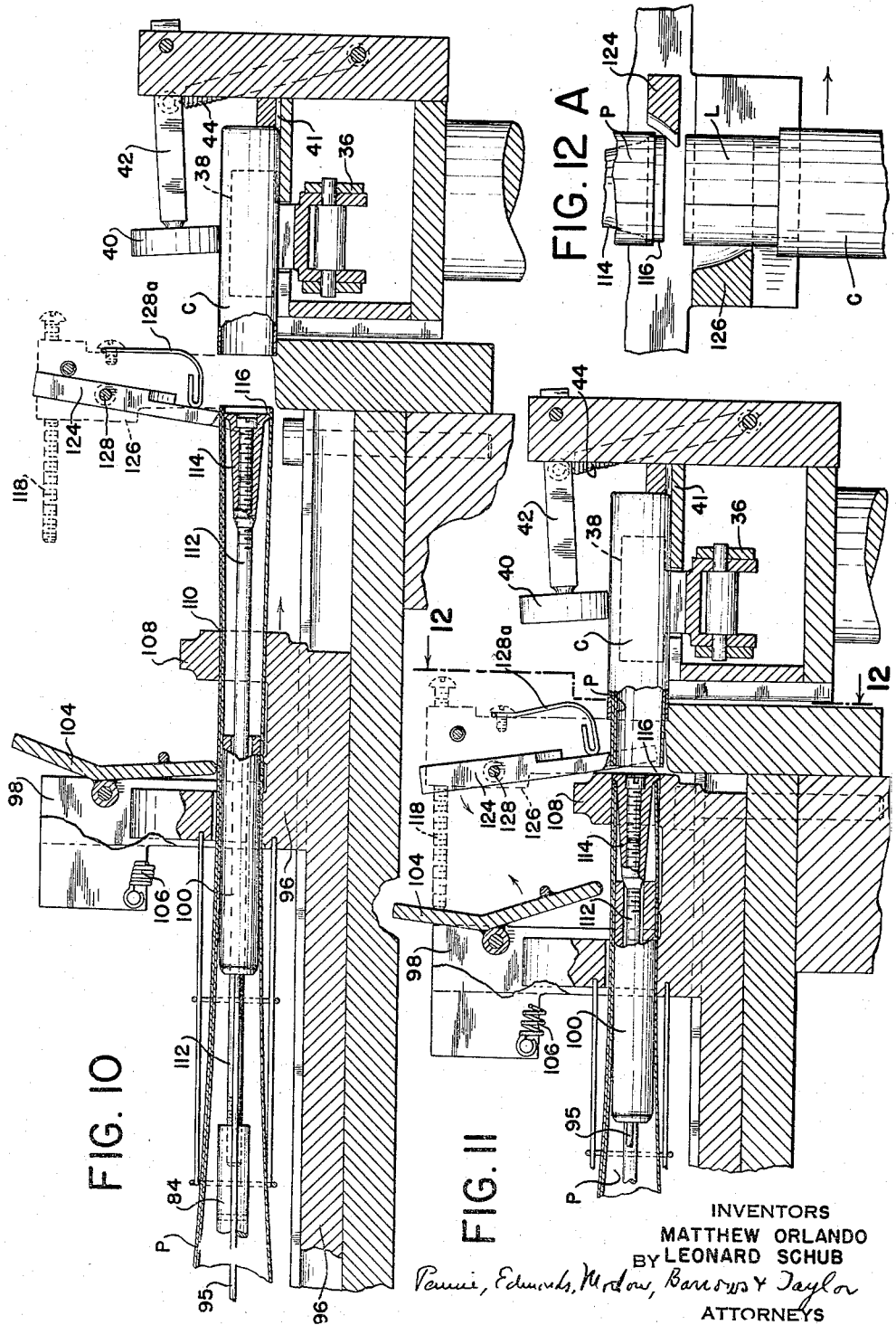

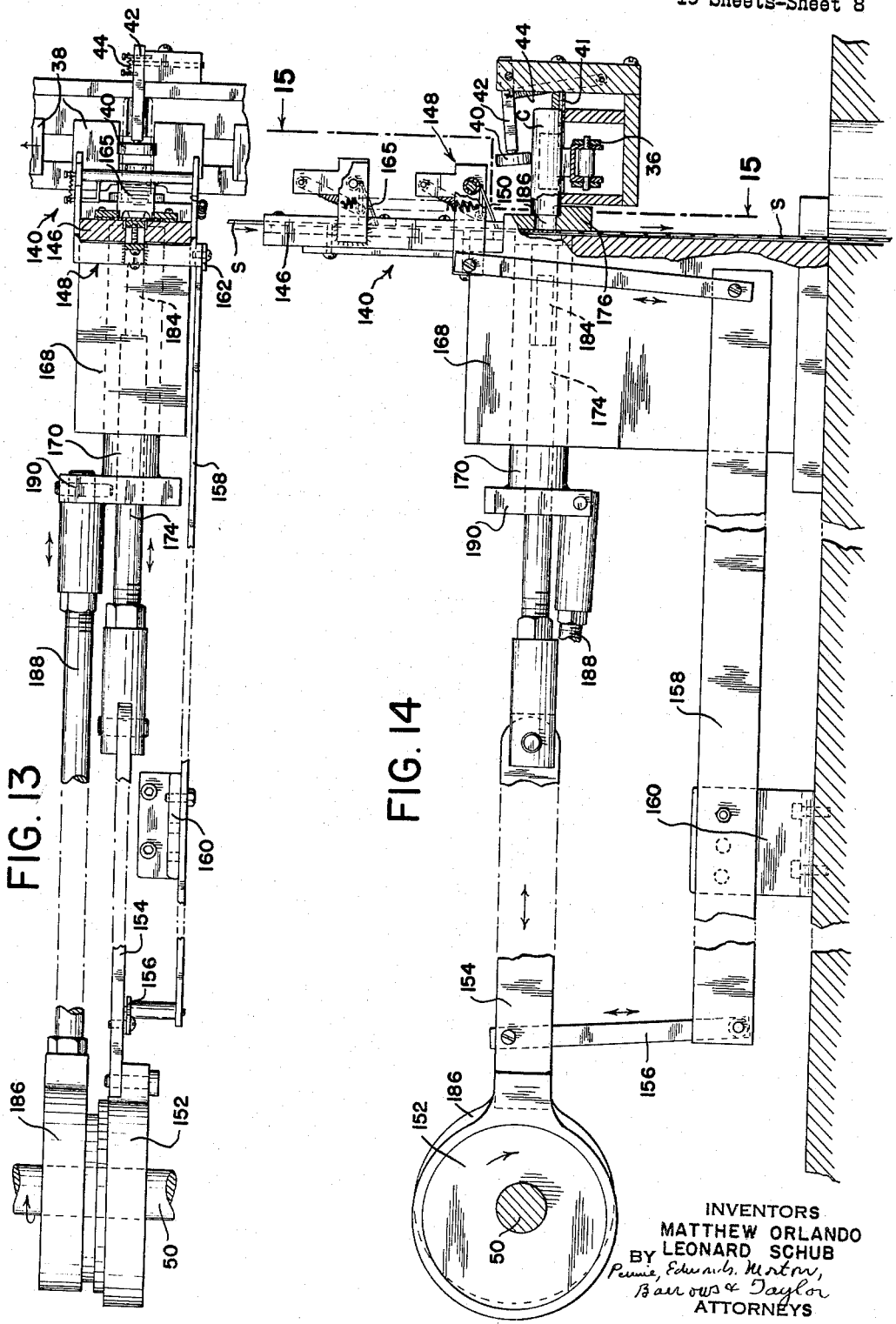

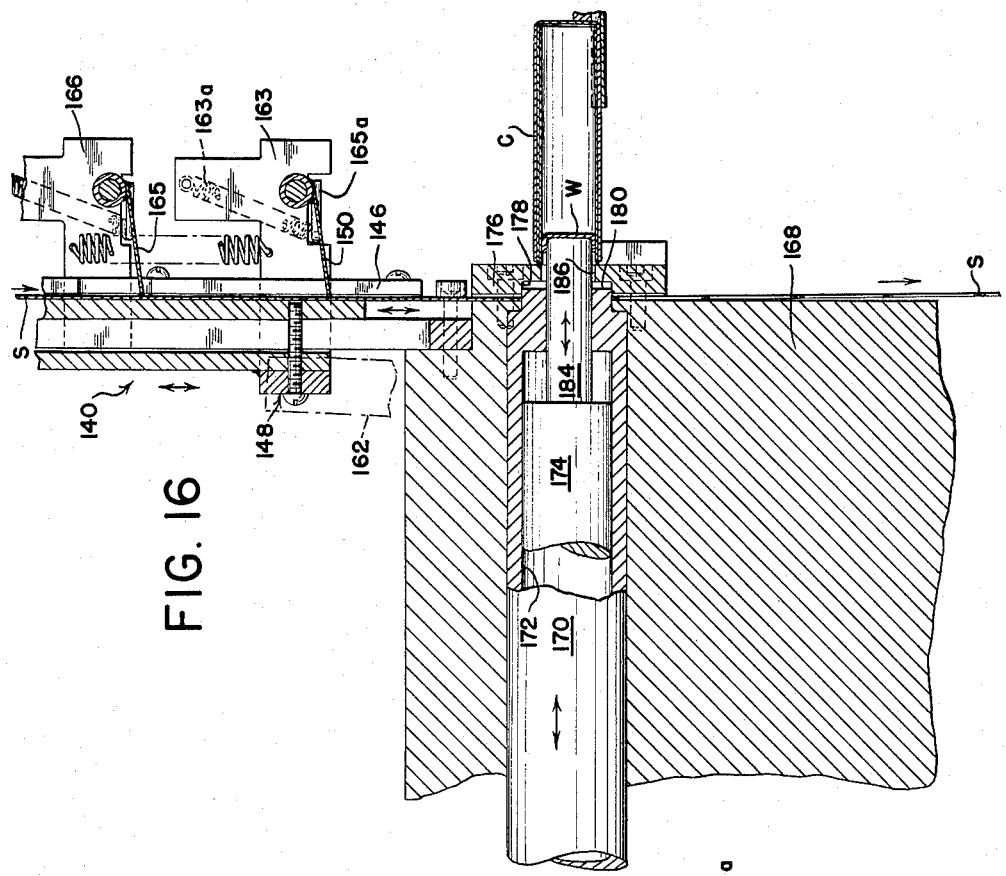
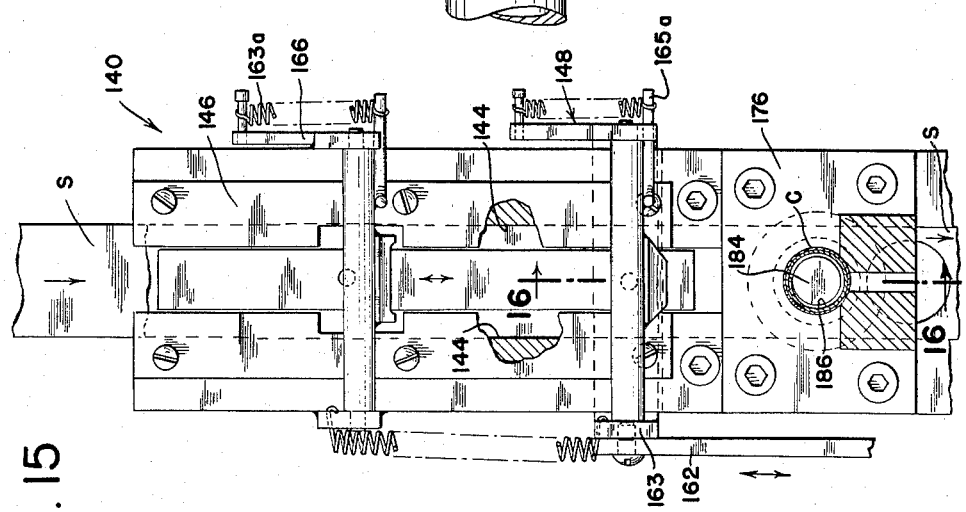

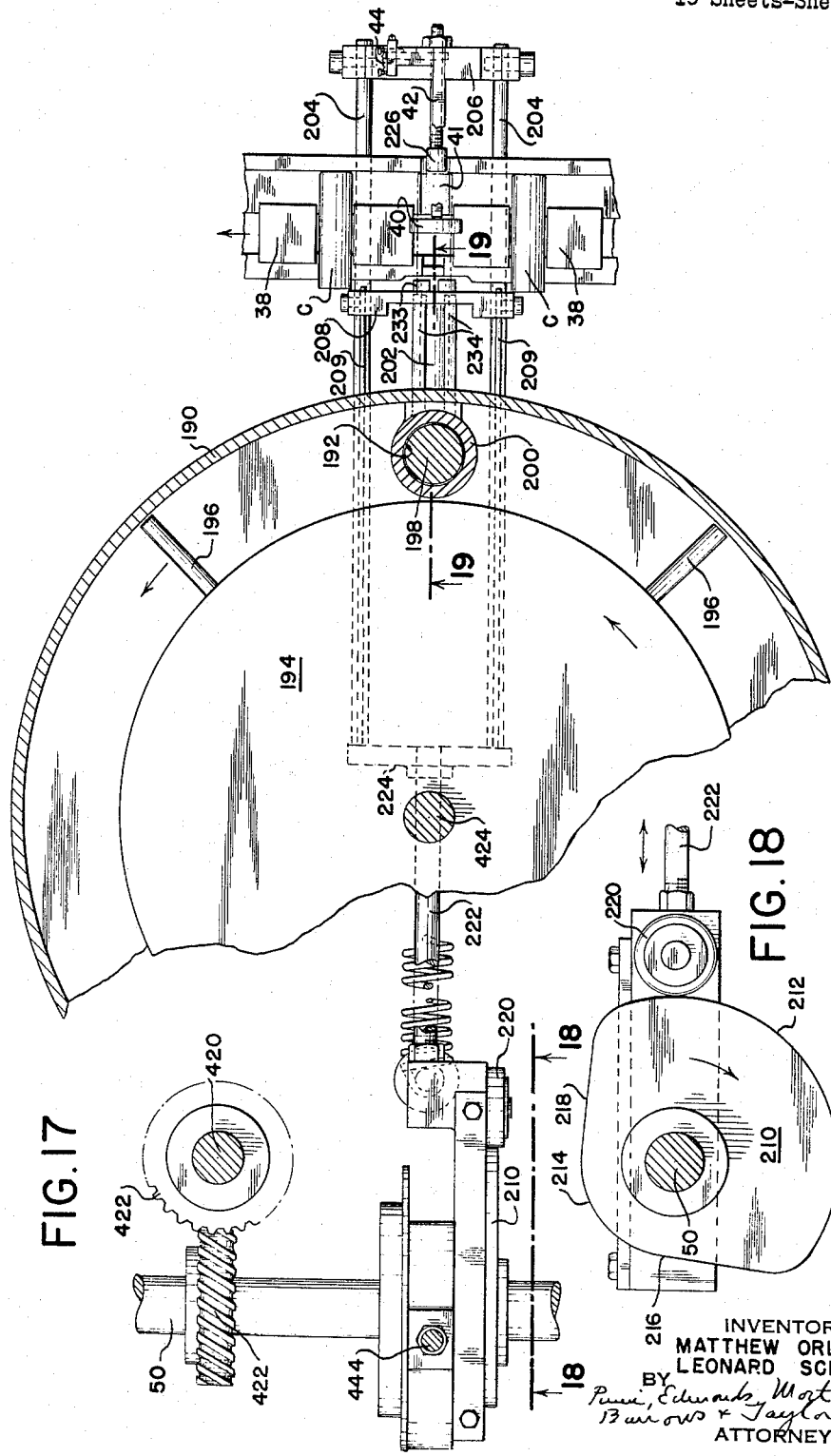

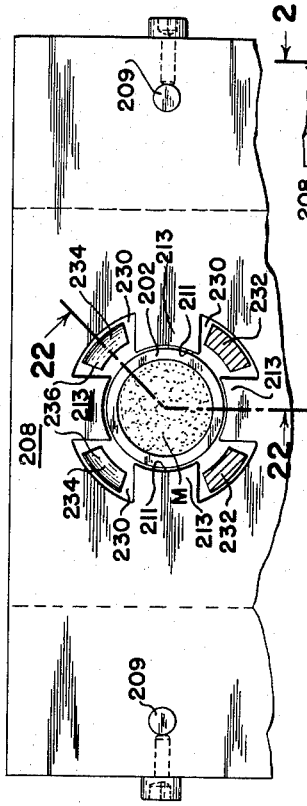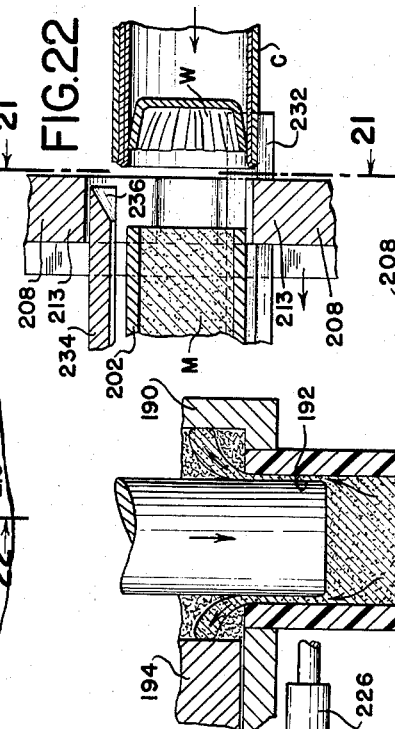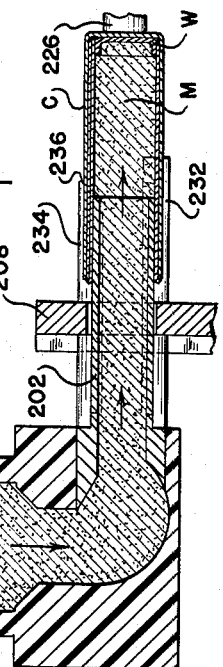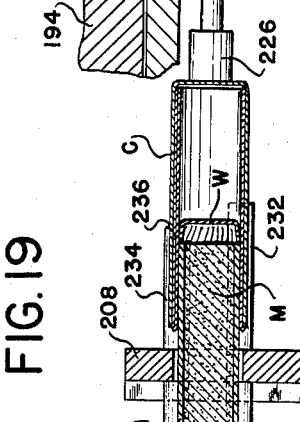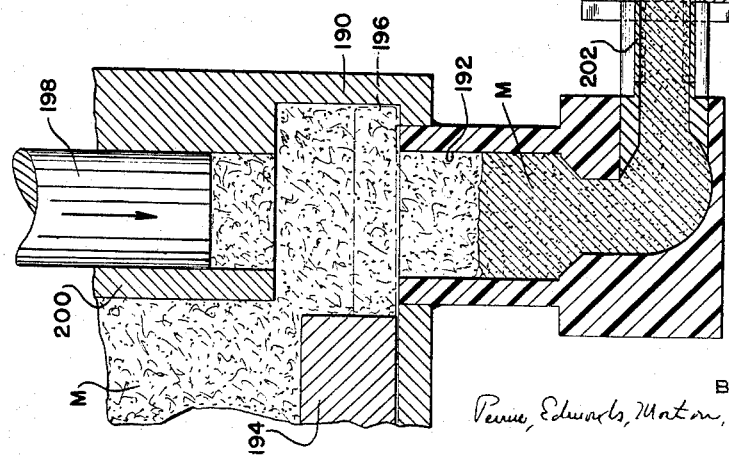

Dec. 6, 1960    M. ORLANDO ET AL    2,962,844
MACHINE FOR MAKING DRY CELLS
Filed Oct. 14, 1955    19 Sheets-Sheet 12

INVENTORS
MATTHEW ORLANDO
LEONARD SCHUB
BY
ATTORNEYS

Dec. 6, 1960   M. ORLANDO ET AL   2,962,844
MACHINE FOR MAKING DRY CELLS
Filed Oct. 14, 1955   19 Sheets-Sheet 13
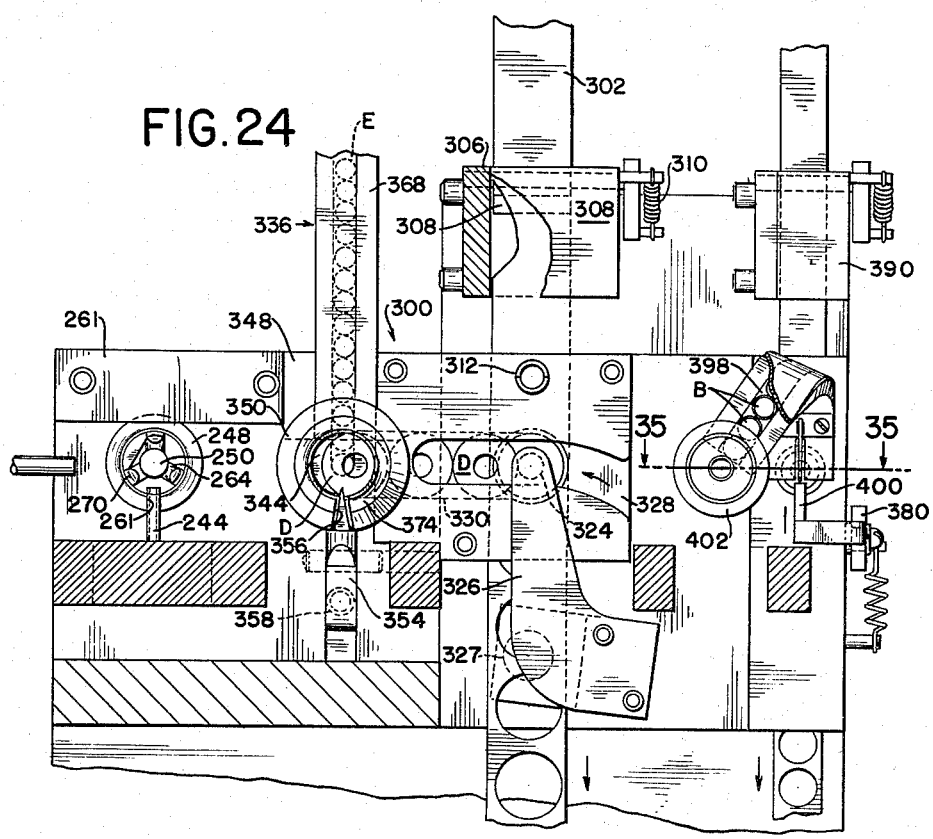
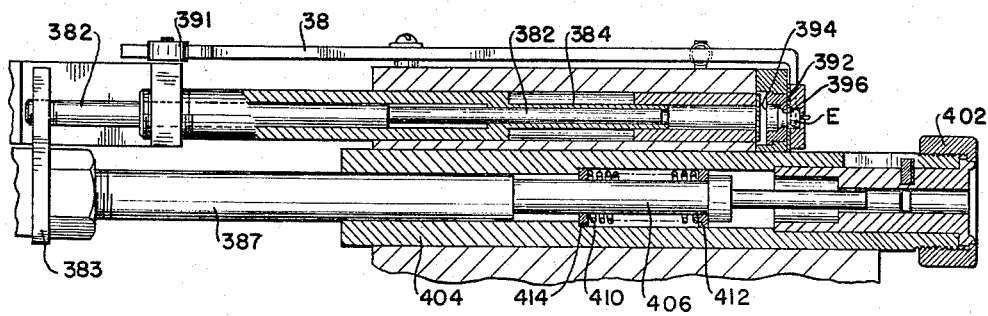
INVENTORS
MATTHEW ORLANDO
LEONARD SCHUB
BY
ATTORNEYS Dec. 6, 1960     M. ORLANDO ET AL     2,962,844
MACHINE FOR MAKING DRY CELLS
Filed Oct. 14, 1955     19 Sheets-Sheet 14
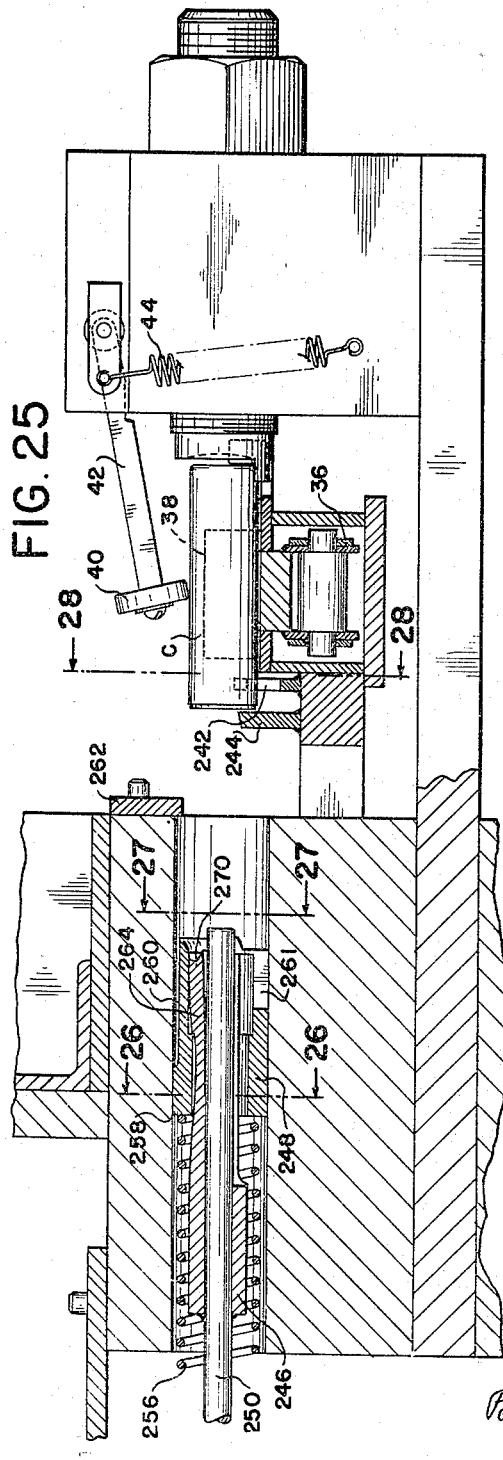
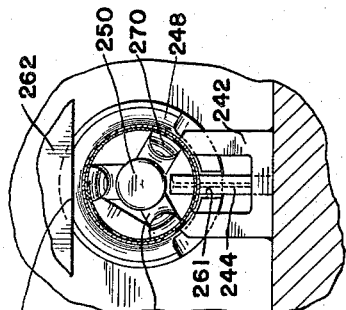
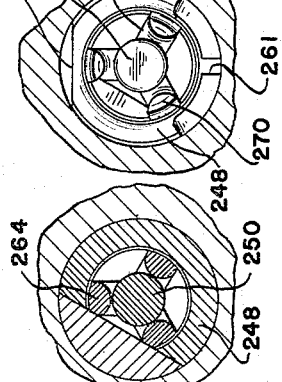
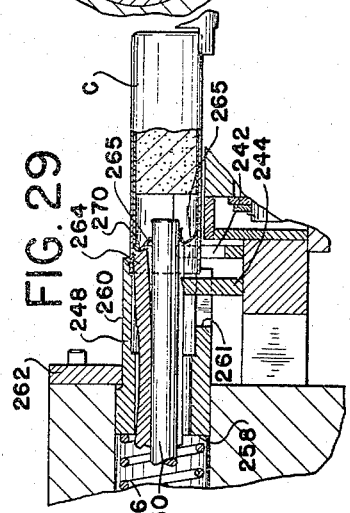
INVENTORS
MATTHEW ORLANDO
LEONARD SCHUB
BY Pennie, Edmonds, Morton, Barrows & Taylor
ATTORNEYS

INVENTORS
MATTHEW ORLANDO
LEONARD SCHUB
ATTORNEYS

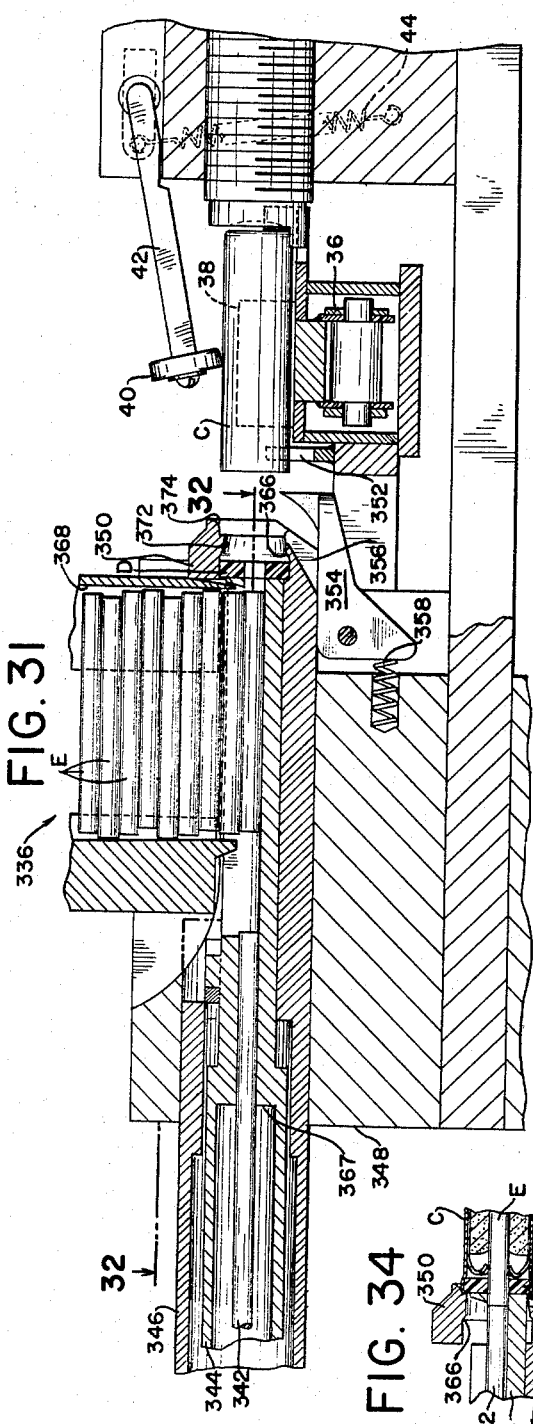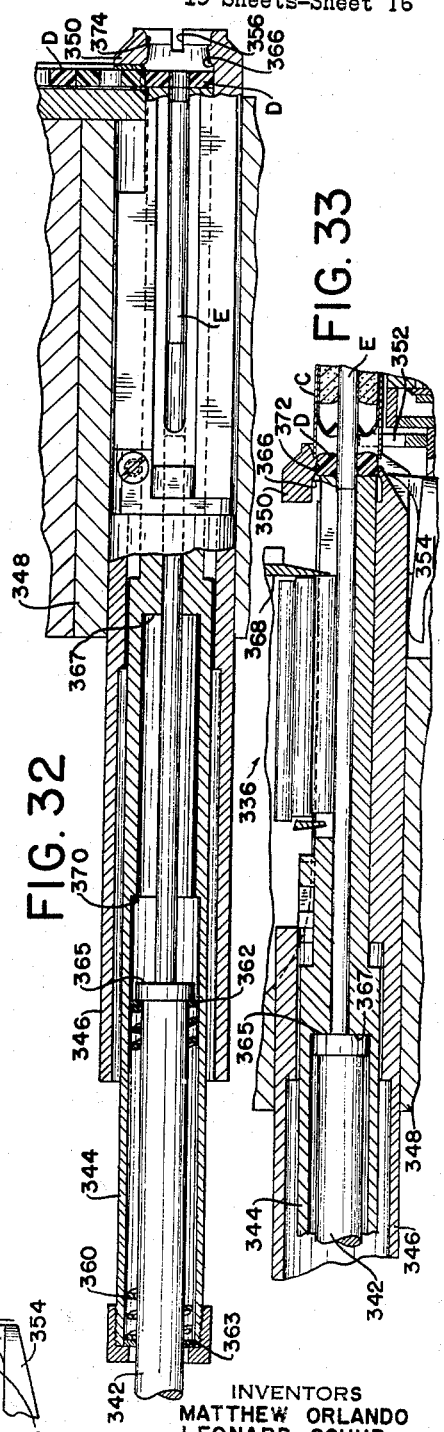

Dec. 6, 1960  M. ORLANDO ET AL  2,962,844
MACHINE FOR MAKING DRY CELLS
Filed Oct. 14, 1955  19 Sheets-Sheet 17
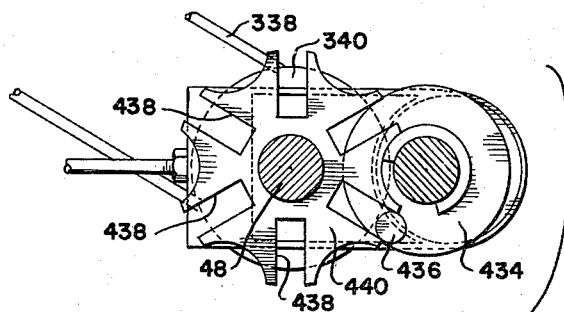
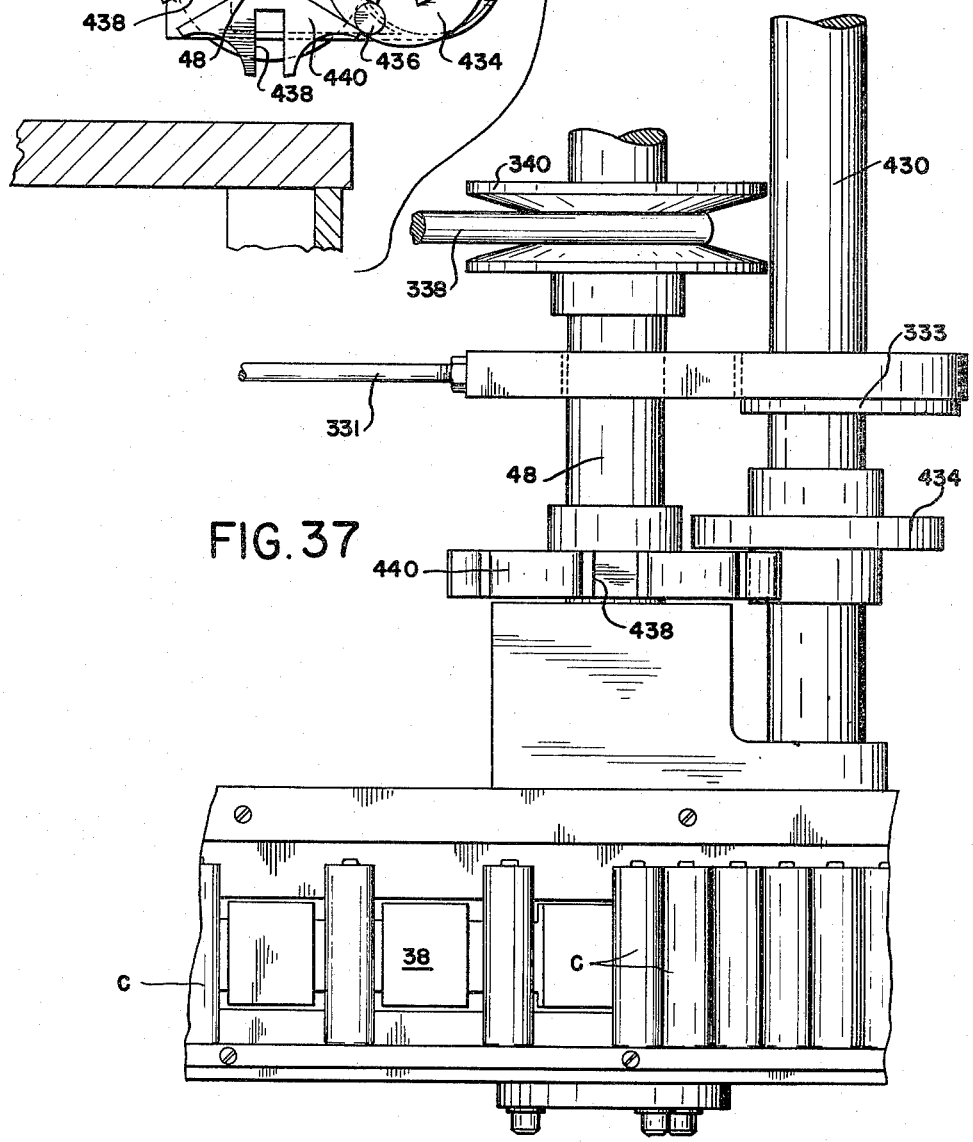
INVENTORS
MATTHEW ORLANDO
LEONARD SCHUB
BY
ATTORNEYS Dec. 6, 1960   M. ORLANDO ET AL   2,962,844
MACHINE FOR MAKING DRY CELLS
Filed Oct. 14, 1955   19 Sheets-Sheet 18
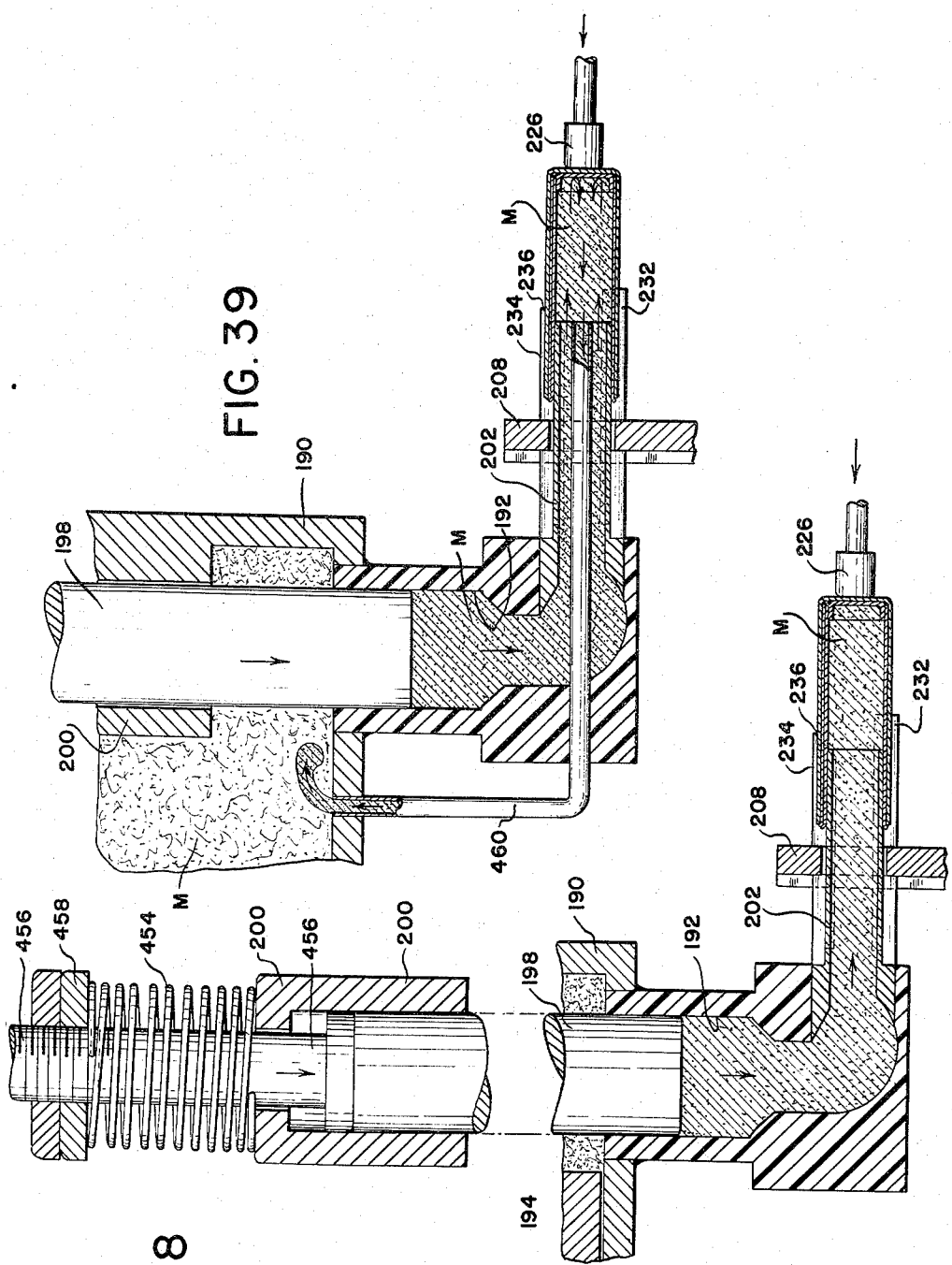
INVENTORS
MATTHEW ORLANDO
BY LEONARD SCHUB
Pennie, Edmonds, Morton, Barrows & Taylor
ATTORNEYS Dec. 6, 1960

M. ORLANDO ET AL 2,962,844

MACHINE FOR MAKING DRY CELLS

Filed Oct. 14, 1955

INVENTORS.
MATTHEW ORLANDO
LEONARD SCHUB
BY Pennie, Edmonds, Morton,
Barrows & Taylor
ATTORNEYS

United States Patent Office 2,962,844
Patented Dec. 6, 1960

2,962,844

MACHINE FOR MAKING DRY CELLS

Matthew Orlando, 573 Pearl St., Oceanside, N.Y., and Leonard Schub, 534 Allen Road, Woodmere, N.Y.

Filed Oct. 14, 1955, Ser. No. 540,463

19 Claims. (Cl. 53—36)

This invention relates to a method of and apparatus for making dry cells, and more particularly to mechanism in which empty metal cans, which are to form the anodes of the cells, are fed to an intermittently moving belt and the other components of the cell are delivered to and inserted in the can as it travels along the belt.

The invention further comprises certain improvements in dry cells, particularly with respect to the closure thereof.

In carrying out our invention, we provide a receiver to which the cans are delivered, the receiver being provided with a track on which the cans are positioned and fed to a chute which in turn delivers them to the belt. It is essential that the cans be arranged on the belt with their open ends at the side facing the various mechanisms which deliver the other components of the cell to the can. The invention comprises means for reversing any cans that are delivered from the receiver in a reversed position, that is, so positioned that the closed bottom of the can would face the side of the belt from which the other components are fed.

The invention further comprises a means for forming a paper liner and inserting it in a can on the belt. In alignment with one of the stations, that is, with its line of travel at right angles to the line of travel of the belt, we provide mechanism comprising a roll of liner material, means for feeding it to a former, means for forming the material into a cylinder, means for cutting the cylinder into predetermined lengths, and means for feeding the cut cylinder into the can.

After the liner has been inserted in the can, we form and deliver a cup washer to the can. This washer is initially positioned in the can near its upper open end. The side walls of the cup have sufficient inherent elasticity to force the paper liner into close proximity to the inner wall of the can as the washer is moved downwardly into the cup.

After the cup washer, which eventually becomes the bottom washer of the cell, has been placed in the can, the belt moves the can into alignment with an extruder nozzle. By way of example, in the manufacture of one type of cell, depolarizing mix of manganese dioxide, conductive carbon, suitable electrolyte salts, such as ammonium chloride and zinc chloride, and enough water to make a pasty mass is delivered to the can in predetermined amount.

In the extruding process, which is herein utilized, the can serves as the metering device to control the amount of mix delivered to it. It is well known that if dry cells are to be produced of uniform quality and having uniform performance characteristics, a uniform amount of depolarizer mix must be placed in each can and the mix must be uniformly compacted in the cans. We accomplish this by first positioning the can in a predetermined position on the nozzle of the extruder. Depolarizing mix is then delivered to the nozzle by a plunger. The nozzle forms a close fit with the inside of the can. The nozzle may also be provided with a by-pass or section forming a discharge passage. Or, as an alternative, the pressure exerted by the plunger may be controlled, as by employing a spring loaded plunger, so that the degree to which the mix is compacted is limited. Thus, when the mix fills the can from the bottom to the end of the nozzle within the can, and has been compacted a predetermined amount, the spring may absorb any further power that is applied or the excess may escape through the by-pass. Such excess is returned to the hopper of the extruding machine.

After the mix has been fed into the can and has forced the cup washer to the bottom of the can to form a separator between the mix and the bottom of the can the upper edge of the liner is folded into the can.

A carbon pencil and a closure member are then placed in the end of the can. We employ a closure member having a central opening for the passage of the carbon pencil. The closure member is formed of a compressible, elastic, plastic material, such as polyethylene, particularly the heat-resisting grades of polyethylene. Other materials that may be employed are polytetrafluoroethylene, polychlorotrifluoroethylene, neoprene, natural rubber, rubbery vinyl copolymers and rubbery vinylidene chloride copolymers. The closure disc may originally be slightly larger than the inside diameter of the can, and the opening may be large enough to permit the pencil to be moved through it without difficulty, or the carbon may be force-fitted in the hole.

In assembling the cell, the carbon is first partly placed in the disc and by continuing the movement and applying sufficient pressure, the carbon is forced into the mix while at the same time the disc is held stationary. When the carbon reaches a predetermined position near the bottom of the can, the closure disc is forced through a funnel-shaped member which reduces its outside dimension and causes it to enter the mouth of the can, where it remains under radial pressure due to the tendency of the material to expand to its normal unrestricted size. The radial compression of the disc not only forms a tight joint between the disc and the inner wall of the cell can, but it also compresses the material of the disc around the carbon pencil and forms a tight seal between them. A brass contact cap is placed on the end of the carbon pencil. The cap blank is cut from a strip that is intermittently fed. It is shaped to form a cap in a suitable die, and then placed on the end of the carbon of a cell in position on the belt.

A cell having many advantages over cells made in other ways is thus obtained. It not only has better, and more uniform performance characteristics, because of the uniformity of the mix and other parts of the cells, but the closure is an important improvement from the standpoint of performance based on the dependability of its seal and also from the standpoint of appearance.

In the accompanying drawings, we have shown a machine forming part of the invention and capable of use in practicing the process of the invention.

In this showing:

Fig. 3 is a similar view of the other end of the machine;

Fig. 4 is a horizontal, sectional view of part of the mechanism for feeding cans to the intermittently moving belt, substantially on line 4–4 of Fig. 2;

Fig. 5 is a vertical, sectional view on line 5–5 of Fig. 4;

Fig. 5a is a detailed, sectional view of a portion of a can feeding mechanism;

Fig. 6 is a plan view of the apparatus at the first station of the belt where a cylindrical liner of paper or the like is formed and placed in the can;

Fig. 7 is a view, similar to Fig. 6, of the forward end of the apparatus for forming the liner, on an enlarged scale;

Fig. 8 is a similar view of the rear portion of this apparatus;

Fig. 9 is a vertical, sectional view on line 9—9 of Fig. 8;

Fig. 10 is a similar view of the portion of the apparatus in front of that shown in Fig. 9, taken along line 10—10 of Fig. 6;

Fig. 11 is a view, similar to Fig. 10, showing the parts in a second position;

Fig. 12 is a vertical, sectional view on line 12—12 of Fig. 11;

Fig. 12a is a sectional view on line 12a—12a of Fig. 12;

Fig. 13 is a plan view of the mechanism for forming the cup washer and inserting it in the can;

Fig. 14 is a side elevation of the apparatus of Fig. 13, parts being show in section;

Fig. 15 is a vertical, sectional view on line 15—15 of Fig. 14;

Fig. 16 is a vertical, sectional view on line 16—16 of Fig. 15, on an enlarged scale;

Fig. 17 is a fragmentary, plan view, parts being shown in section, of the extruding mechanism by means of which the depolarizing mix is fed to the can;

Fig. 18 is a deailed view of cam mechanism on line 18—18 of Fig. 17;

Fig. 19 is a vertical, sectional view of the extruding mechanism on line 19—19 of Fig. 17;

Fig. 20 is a similar view with the parts in a second position;

Fig. 21 is a vertical, sectional view on line 21—21 of Fig. 22;

Fig. 22 is a similar view on line 22—22 of Fig. 21;

Fig. 24 is a vertical, sectional view on line 24—24 of Fig. 23;

Fig. 25 is a vertical, sectional view of the apparatus which folds the upper portion of the paper liner at the first station of Figs. 23 and 24, after the depolarizing mix has been placed in the can, on line 25—25 of Fig. 23;

Fig. 26 is a detailed, sectional view on line 26—26 of Fig. 25;

Fig. 27 is a similar view on line 27—27 of Fig. 25;

Fig. 28 is a similar view on line 28—28 of Fig. 25;

Fig. 29 is a sectional view in the same plane as Fig. 25, showing the parts in a second position;

Fig. 31 is a vertical, sectional view of the apparatus for feeding the carbon electrodes and assembling them with the closure discs prior to their delivery to the cell cans, on line 31—31 of Fig. 23;

Fig. 32 is a horizontal, sectional view on line 31—31 of Fig. 30 showing the parts in a second position;

Fig. 33 is a detailed view showing the carbon pencil in the can and the disc about to be fed into the can;

Fig. 34 is a similar view of the assembly just after the disc has been inserted in the can;

Fig. 35 is a detailed, horizontal, sectional view of the mechanism for making the brass contact cap and placing it on the carbon pencil, taken on line 35—35 of Fig. 24;

Fig. 36 is a vertical, detailed, sectional view on line 36—36 of Fig. 3;

Fig. 37 is an enlarged, detailed, plan view of a portion of the right end of the apparatus;

Fig. 38 is a detailed, vertical, sectional view of a portion of the mix extruding mechanism, similar to Fig. 20, showing a modification;

Fig. 39 is a similar view showing a further modification; and

Figs. 40 to 50, inclusive, are a series of views, some in elevation and some in vertical section, illustrating the series of steps performed in constructing the cell of the present application.

Figure 1:
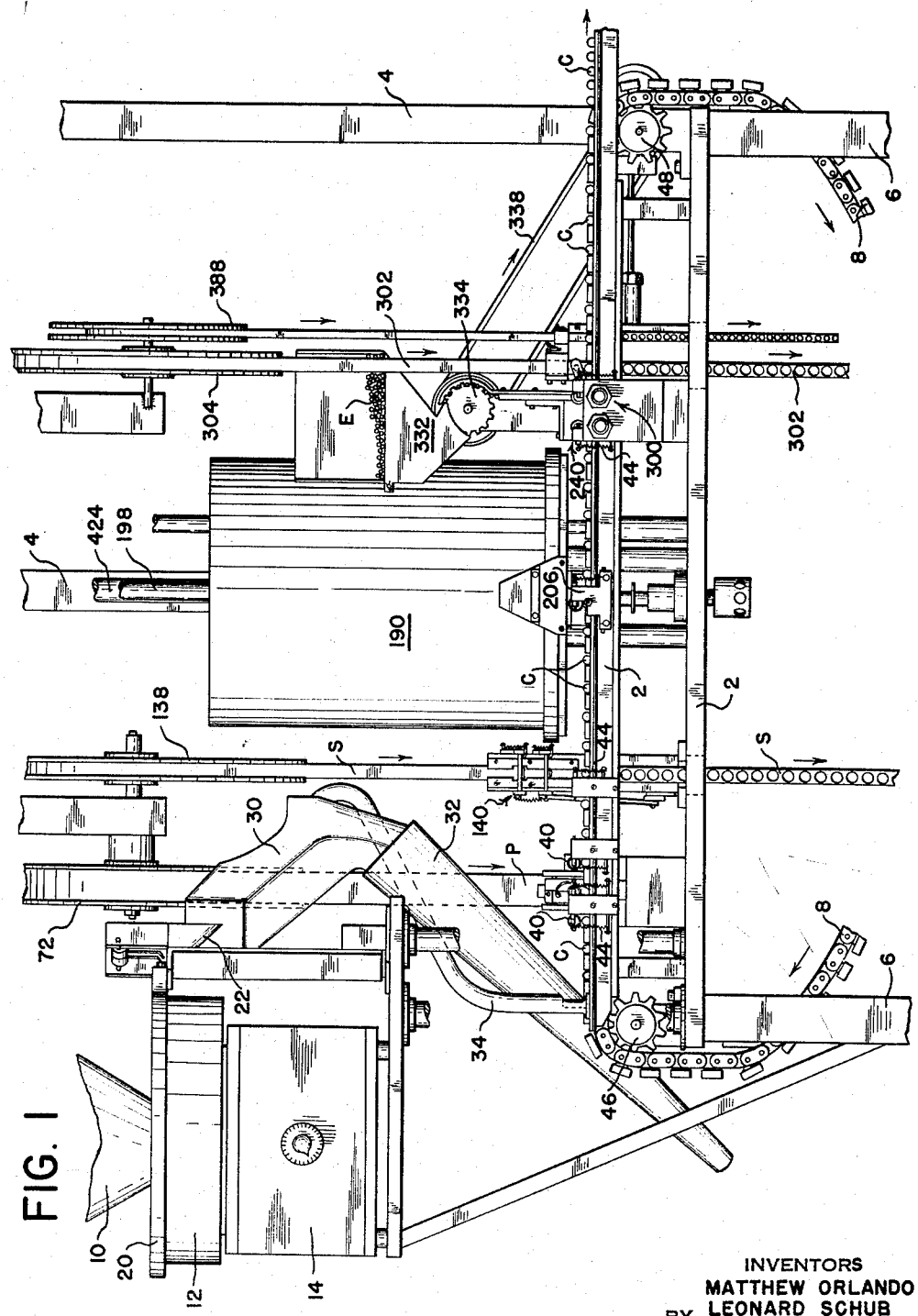
Fig. 1 is a front elevation of the complete machine.
Figure 2:
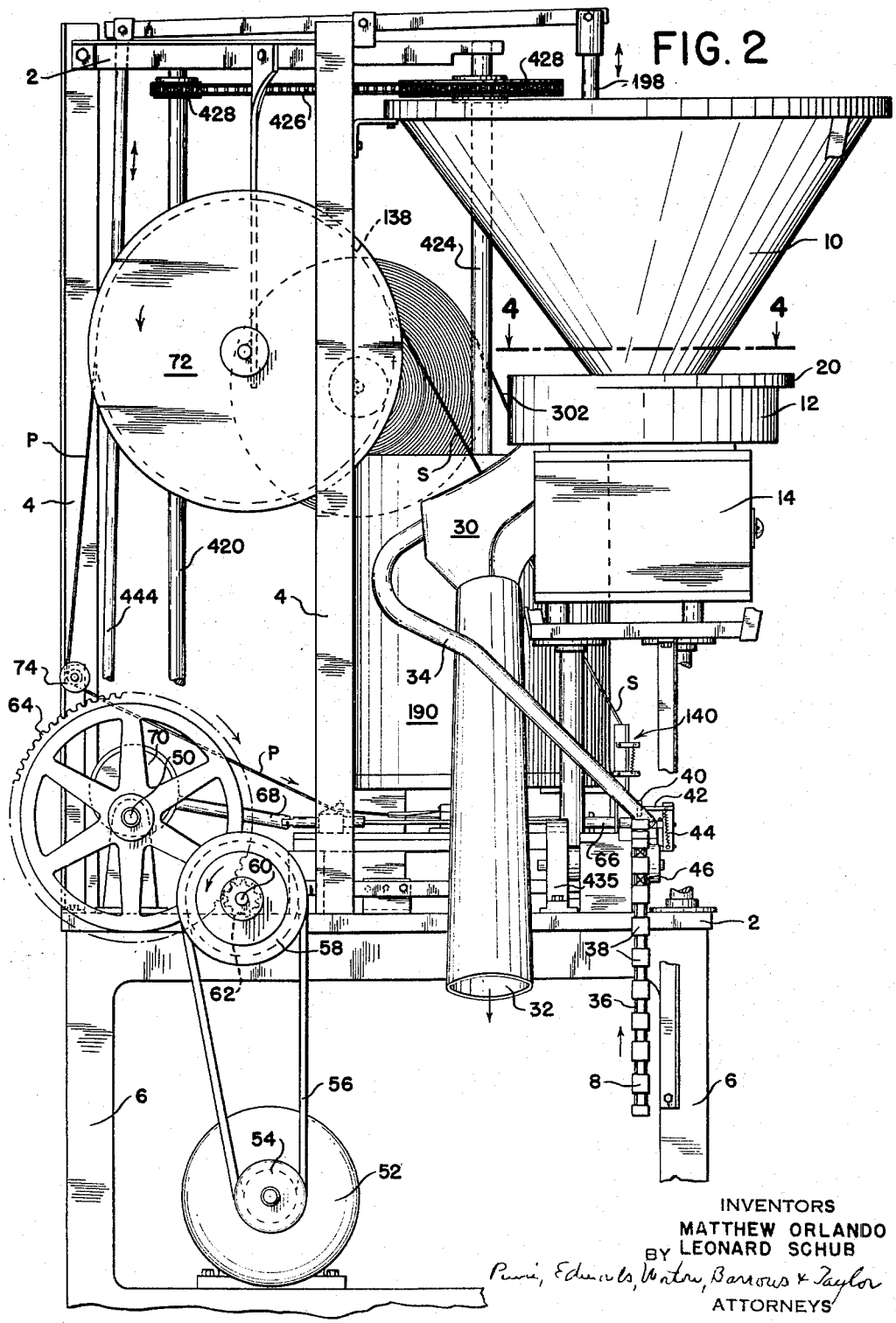
Fig. 2 is an end elevation, looking from the left in Fig. 1.

Referring to Figs. 1 and 2 of the drawings, the machine comprises longitudinal frame members 2 and transverse frame members 4, supported at a desired height above the floor by legs 6. An endless belt 8 runs along the front of the machine from end to end. The belt is intermittently moved and it supports the cans C (Figs. 10 and 11) in position in front of a series of stations where various operations are performed. The cans C are delivered to the belt at the left end of the machine, the location and general arrangement of the feeding mechanism being shown in Figs. 1 and 2, and certain details being more clearly disclosed in Figs. 4 and 5. The cans are placed in a funnel-shaped hopper 10, which discharges them into a receiver 12. Receiver 12 is mounted on a vibrator 14 which agitates the cans in the receiver and causes the cans to move up toward a pair of tracks 16 and 18 near the outer wall 20 of the receiver (see Fig. 4). The tracks are inclined toward the wall and when the cans are on them, the vibration of the receiver moves the cans along the tracks circumferentially of the receiver. The tracks extend to and terminate at an opening in the wall of the receiver. A chute 22 (see Fig. 5) receives the cans as they leave the tracks 16 or 18. At this point, we provide the means to properly orient the cans, that is, arrange them so that they will reach the belt 8 with their open ends facing inwardly toward the mechanisms which deliver the other cell components to the cans. At the end of each track a hook 24 is pivotally mounted (Fig. 5). This hook is weighted at 26, the weight normally retaining the hook in the full line position. Cans to reach the belt in the proper arrangement should have their closed ends, or bottoms, in front when they are on the chute 22, as indicated. If a can reaches hook 24 in a reversed position, as illustrated by the first can on the track in Fig. 5, the can moves the hook against the force of the weight, to the dotted line position. The can is then reversed as it is delivered to the chute. When a can on the track is in proper position, as illustrated by the second can on the track in Fig. 5, the end 28 of the hook merely contacts the bottom of the can and the hook is swung just enough to permit the can to pass. It is then delivered to chute 22 without being reversed. Chute 22 is surrounded by a larger chute 30 which communicates with a discharge tube 32. The end of chute 22 communicates with a flexible tube 34 extending (see Fig. 2) to the beginning of the operative flight of the belt at the left side of Fig. 1. The diameter of tube 34 is such that it receives the cans in tandem (see Fig. 4). By providing the overflow mechanism 30—32, cans may be fed slightly faster than the capacity of the machine. When the supply of tubes backs up on the open sided chute 22, the excess will fall onto the surrounding chute 30, and be conveyed to some point from which they can be returned to hopper 10.

The endless chain 8 consists of links 36 with blocks 38 mounted on the links. These blocks are spaced from each other a distance slightly greater than the diameter of a can and receive the cans between them. When the can is at a station where an operation is being performed, it is firmly held in place and rests upon a saddle 41. At each station a roller 40 engages the top of the can. These rollers are mounted on pivoted arms 42, and the arms are drawn downwardly to extert the desired pressure on the can be a spring 44 secured to the arm and to the frame of the machine. The chains pass over sprockets 46 and 48 at the ends of the machine. A cam shaft or drive shaft 50 extends along the back of the machine parallel to the operative flight of the belt. While this shaft may be driven from a source of power and in any suitable way, the drive mechanism of a machine that has been in operation will be described as illustrative. A motor 52 is supported beneath the table, and a pulley 54 is mounted on the motor shaft. A belt 56 passes over this pulley and over a pulley 58 on shaft 60. Shaft 60 is also provided with a pinion 62 meshing with a gear 64 on shaft 50.

The first station on chain 8 is illustrated at the left of Fig. 6. At this station a test is made for defective cans, cans having a smaller diameter than specified, or the absence of a can from the pocket of the chain. A plunger 66 is slidably mounted in brackets 67 and 69 on the frame. Its rear end is connected to a link 68 which is in engagement with cam 70 on shaft 50. In normal operation plunger 66 is reciprocated and moved into a can to a point near the bottom of the can. The plunger is of very slightly less diameter than the inside diameter of the can. If the can is flattened or otherwise deformed, or if it is small in diameter, the plunger is unable to move to a point near the bottom of the can. Or if there is no can at the station, the roller 40 arrests the movement of the plunger. When the plunger is arrested for any of these reasons, a suitable signal may be actuated, or the machine may be stopped by shutting off the power to motor 52.

At the middle station of Figs. 6 and 7, the paper liner is formed and inserted in the can. Details of this operation are shown in Figs. 6 to 12, inclusive. Paper P of a width to form a cylinder of a diameter to fit in the can with some overlap is fed from a reel 72 over an idler roll 74 (see Fig. 2) to a former. The former consists of a stationary plate 80 (Fig. 8) over which the paper passes. Plate 80 is formed into a cone 82 at its forward end to wrap the paper around an inner stationary member 84 as the paper is pulled through the apparatus. Member 84 is supported from a transverse bar 86 by bolt 88. The movable parts of the liner former are driven from shaft 50 by cam 90. This cam reciprocates a rod 92 (Fig. 6) that is connected to a frame 94. The frame 94 is in turn connected to a reciprocating base member or plate 96 (Fig. 7) which extends under the stationary former (see Figs. 9 and 10) and is connected to a movable frame 98 forwardly of the former. A floating inner cylinder 100 is associated with frame 98. This cylinder is in axial alignment with member 84 of the former, but it is moved with frame 98 by rod 95. As shown, the cylinder 100 is connected to frame 94 by the rod 95. Rod 95 extends through the former slightly spaced from member 84 (see Fig. 8).

An arm 104 is pivotally mounted on frame 98 and this arm is urged in a clockwise direction by a spring 106 connected to the arm and to a pin on the frame. The end of this arm clamps the formed paper cylinder between it and plate 96 with cylinder 100 used to transmit the pressure which squeezes the paper. When these parts are moved forwardly by the cam 90, the paper is pulled forwardly.

Frame 98 also carries one element 108 of the die by means of which a proper length of the paper cylinder is severed. As shown, it consists of a bore of the diameter of the cylinder having a cutting edge 110 at the front end of the bore. From the forward end of cylinder 84, a rod 112 extends forwardly through the cylinder 100 and it carries the other element 114 of the severing die on its end. As shown, die 114 tapers and its end 116 is of such diameter that when cutting edge 110 of die member 108 passes over it, as shown in Fig. 11, the portion of the paper cylinder to the right of the die is severed. Just prior to the severing operation, an adjustable pin 118 engages arm 104 to release it, and interrupt the paper feed. If the paper were being fed at the time of severing, the end from which the cylinder was cut would be crumpled. The operation of the parts is so timed that the severed cylinder extends into the can to a point spaced from the bottom an amount equal to the amount that the other end projects from the can, as indicated in Fig. 11.

A locking member 120 (Fig. 9) somewhat similar to locking member 104 is arranged over the cylinder forming mechanism and is urged clockwise by a spring 122. This locking member holds the paper against reverse movement when the moving parts of the liner former and feeder are returning to their starting positions. The grip of arm 104 on the paper is able to pull the paper forwardly against the resistance of arm 120.

Just beyond the severing die, we provide a guide through which the liner passes into the can. This guide has a final bore of a size to snugly receive the cylinder. As shown in Fig. 12, it consists of a pair of plates 124 and 126 with approximately half of the circular bore formed in each. The plate 126 which, is at the side from which the chain feeds, is stationary and of greater thickness than plate 124. It is supported on a suitable part of the frame of the machine and it carries stop pin 118. Plate 124 is pivoted on pin 128 carried by the plate 126. Plate 124 is displaced back along the axis of the liner beyond plate 126 so that the edge of the severed liner cylinder in the can will clear it when it is moved by the chain to its next station, to the right in Fig. 12.

In a position of rest, plate 124 (Fig. 10) is near the end of die member 114 (Fig. 10) and it is retained in such position by a spring arm 128a carried by plate 126. As the movable die member 108 approaches the end of its operative movement (Fig. 11) it moves plate 124 away from its path against the tension of spring 128a to a position where it and its bore will be over the severed liner at the time of the cutting operation. As soon, however, as the forming mechanism starts its return stroke, plate 124 will be returned to the position of Fig. 10. The projecting end of the liner is then clear to move for the next indexing of the feed chain (Fig. 12a).

In dry cell construction, electrolyte salts, such as zinc chloride and ammonium chloride, are generally mixed with a starch paste which is coated on the liner. The electrolyte salts and water are mixed with the depolarizing mixture in the construction of a cell. The paper forming the liner may be coated on either side, or an uncoated paper may be used, depending on the cell construction chosen. Films of various compositions, coated or uncoated, may be substituted for paper, or a film formed primarily of the starch or other coating may be employed.

Figure 41:
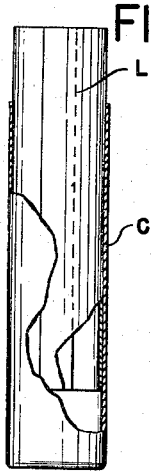

At the next station the liner, projecting from the can as shown in Figs. 7 and 41, is moved into the can until its lower edge is in contact with the bottom of the can and its upper edge approximately at the upper edge of the zinc can. A plunger rod 130 carries a cone-shaped head 132 which enters the end of the liner and moves it into the can. The shape of the head and the pressure applied by the plunger rod through spring 133 are such that the operation tends to flare the end of the liner slightly over the upper edge of the can. Plunger rod 130 is carried by a block 134 that is secured to a bracket 136. Bracket 136 is secured to or forms a part of reciprocating base member 96 of the liner forming mechanism.

After the liner has been positioned in the can, it is indexed to the next station where a cup washer is inserted in the liner. As shown in Fig. 1, the sheet S is fed from a reel 138 through apparatus generally designated by the numeral 140 where circular blanks are cut from the sheet and formed into a cup washer W (see Figs. 16 and 43). The mechanism is shown in detail in Figs. 13 to 16 of the drawings. As shown, the sheet passes through a channel 144 in a frame 146 mounted above and to one side of the chain (see Fig. 16). A reciprocating frame 148 carries a pivoted feeding member 150. This frame is driven from cam 152 (Fig. 14) on main shaft 50. Cam 152 imparts an horizontal reciprocating movement and an up and down movement to cam rod 154. A link 156 is connected to rod 154, and to end of lever 158. The lever is pivoted on bracket 160 carried on the bed or table of the machine. Its other end is connected to link 163 which is, in turn, connected to reciprocating frame 148. Frame 148 is moved downwardly by the drive and when it is moved, feeding member 150 feeds the sheet S downwardly. Coil springs 163a connected to an arm 165a, hold feeding member 150 in engagement with the sheet on the feeding stroke, and relieves it when the frame 148 is moved upwardly. At that time, the sheet is held against retraction by a similar holding member 165 carried by a stationary frame 166 mounted on frame 146 above the frame 148.

A pair of concentric punches are arranged at this station to punch a blank from the sheet S and shape it into a cup washer. The punches reciprocate in an opening in block 168 (see Fig. 16). The outer punch 170 is provided with a hollow section 172 to receive the inner punch 174. The two punches co-act with a die block 176 mounted beneath frame 146. This die block has a cavity 178 to receive the head 180 of the punch 170. The position of the punch 170 at the end of a forward stroke is shown in Fig. 16. It passes through the strip S, cuts a circular blank and deposits it in cavity 178. Head 184 of punch 174 then moves through cavity 178. The severed blank forms a cup around plunger head 184 as the plunger head travels through bore 186 of the die block and positions the cup washer W in the cell near the open end (Fig. 16). Inner punch 174 is connected to cam rod 154 to be reciprocated thereby. A second cam 186 is arranged on shaft 50 adjacent cam 152. This cam reciprocates a cam rod 188 which is connected to a member 190. Member 190 has a central opening for passage of punch 174 and is connected to outer punch 170 to reciprocate it.

After the cup washer has been placed in the end of the can, the can is indexed to the position where the depolarizing mix is placed in it. As shown in Fig. 1, the mix is placed in a container 190 of a convenient size to contain a considerable quantity of mix. The mix may consist of manganese dioxide, conductive carbon, suitable electrolytic salts, such as zinc chloride and ammonium dichloride, and sufficient water to form a pasty mix, or of other compositions to co-act with the anode to form a cell. The container 190 communicates with a cavity 192 through an opening in the bottom of the container (see Fig. 19). A rotating member 194 in the bottom of the container is provided with arms 196 to sweep the mix into the cavity. The cavity is of greater capacity than the amount of mix delivered to each can. A plunger 198 is arranged in a guide 200 in the container and this plunger is reciprocated from the position shown in Fig. 19 into the top of cavity 192 as shown in Fig. 20. An extruding nozzle 202 is arranged at the lower end of the cavity extending transversely to the line of travel of the endless chain and aligning with a can at the station. By lateral movement, the can is moved onto the end of the nozzle to any predetermined depth. Figs. 19 and 20 show a can in position and the way it functions as the metering means in connection with the delivery of depolarizing mix to it. At this station we provide a frame consisting of outer member 206 and inner member 208. A cam 210 on shaft 50 (see Figs. 17 and 18) has two dwells 212, 214 and two cam portions 216, 218. It engages a cam follower 220 which is carried by a rod 222 connected to a cross head 224. Cross head 224 is in turn connected to member 206 through rods 204 and to member 208 through rods 209. The cam thus provides for a period of rest for members 206 and 208 as the belt is indexing, an inward movement to bring the can over the nozzle 202 as shown in Figs. 19 and 20, a period of rest while the can is filled with mix, and an outward movement to return the can to its original position on the chain. Outer frame member 206 carries a plunger 226 which engages the bottom of the can to move it to filling position.

The frame member 208 has an opening 211 for the passage of the extruder nozzle, but too small to permit the can to enter. Communicating with this opening are a series of openings 230 (see Fig. 21). A pair of lower guide arms 232 and a pair of upper guide arms 234 are secured to the face of cavity member 192 and extend through these openings. As the can moves toward the extruder nozzle, the can is supported, positioned and guided by lower guides 232 (see Fig. 22). It is essential that the nozzle and can be accurately aligned. As shown in Fig. 22, the cup washer W has merely been inserted in the end of the can and it remains there until it is moved to the bottom, first by the extruder nozzle and then by the mix itself as it is delivered to the can. The material from which the washer is made is of sufficient thickness that as the extruder nozzle enters the can, it engages the upper edge of the washer (Fig. 19). Upper guide arms 234 have notches 236 at their ends (Fig. 22) to facilitate the entrance of the can in the space provided between guide arms 232—234 and nozzle 202. The function of member 208 is to remove the can from the nozzle after the filling operation takes place. Rotation of cam 210 during cam action 216 (Fig. 18) will impart a lateral movement to member 208 causing its four inwardly projecting sections 213 to contact the can and move it to a position similar to that shown in Fig. 22. Notches 236 on guide arms 234 act as a funnel to position the can with the nozzle, and they tend to round out the open end of any deformed can which might not go onto the extruder nozzle if it were left in its deformed condition. The number of guide arms 234 and associated notches 236 may vary, depending on the amount of correction which is to be imparted to the deformed cans.

Various means may be employed to insure delivery of the proper amount of the mix and its compacting to a desired consistency in the cans. The can is, of course, arranged in a predetermined position on the extruder nozzle affording a space of predetermined cubic capacity. Next, it is necessary to provide means to compact the mix in each can to the same extent. In obtaining this result, the extruder nozzle must fit the can so snugly as to eliminate any tendency for the mix M to move toward the open end of the can as the can cavity is filled. It will be noted in Fig. 19 that the material M which is in the cavity and extruder nozzle has been compacted to a greater density than the material in the container 190. By providing a plunger 198 that fits the bore of cavity 192 with some clearance, we provide an escape passage for the excess material after the can is filled and a predetermined density is reached. The clearance between the cavity 200 and the plunger 198 is such that the normal movement of the mix M under pressure is towards the nozzle and into the can since the cross section area of the nozzle opening is considerably greater than the area of the cavity and plunger clearance. When the can is filled, the escape path for the excess material is through the cavity plunger clearance and the continuing movement of the plunger increases the pressure to a point where the material must extrude through this clearance space.

The only other opening where the material might flow is between the nozzle and the liner and since this space has been purposely made very small by close fitting the nozzle to the liner, the extrusion of the material at this point is made impossible so long as the clearance space between cavity and plunger is controllably made larger than the space left as practical tolerance between the nozzle and the liner. The action described above is illustrated on an exaggerated scale in Fig. 20. The washer W is moved from the position at the top of the can (Fig. 22) by the movement of extruder nozzle 202 into the can to the position shown in Fig. 19. The flow of mix into the can moves it to the bottom of the can to form the bottom washer of the cell (Fig. 20). In its movement, the side wall or skirt of the washer expands the liner to bring it in close contact with the inner wall of the can.

After the can is loaded with mix M, the upper edge of the liner is folded, the carbon pencil and closure disc inserted and a brass contact cap placed on the end of the carbon. The stations at which these operations are performed are shown in plan view in Fig. 23 and in front elevation in Fig. 24, and the details of each operation are shown in the other remaining views. Thus, in Figs. 25 to 29, the mechanism for folding the upper edge of the liner is shown. As shown (see Figs. 25 and 28) the can C is supported at two points by a saddle 242. A stripper arm 244 extends in front of the can to prevent it from retracting with the plunger. The mechanism consists of an inner plunger 246 and an outer plunger 248. They are reciprocated by a rod 250 (Fig. 23) which is connected to cam rod 342 by an arm 254. Cam rod 342 is reciprocated by a cam on shaft 50. A spring 256 surrounds the inner plunger and one end of the spring engages a shoulder 258 formed on the outer plunger. The other end of the spring engages a collar 251 on rod 250. When the inner plunger reciprocates forwardly, the spring is thus placed under tension to move the outer plunger forwardly. The outer plunger has a flattened portion 260. Opposite the flattened portion, a slot 261 is provided to receive stripper arm 244. Plate 262 engaging flattened portion 260 properly aligns the slot 261 with the stripper arm.

The movement of the outer plunger brings it into engagement with the end of the can. Further movement of rod 250 against spring 256 causes spring fingers 264 on the end of the inner plunger to engage the end of the liner and fold it inwardly as shown in Fig. 29 at points 265. The curvature 270 on the ends of the fingers 264 facilitates folding the liner in this manner.

Referring to Figs. 31 to 34, the closure disc, forming its assembly with the carbon electrode and the insertion of the assembly into the can, is performed at station 300 (Fig. 24) beyond the station 240 where the end of the liner was folded. The material from which the disc is formed, is cut from a strip 302 delivered from a reel 304 (Fig. 1). A bar or frame 306 reciprocates and it carries a feeding finger 308 which engages the material and feeds it the proper distance on each downward stroke. Spring 310 retains the finger in its operative position on the down stroke and permits it to slide over the material without effect on the return stroke. The material being much thicker and more substantial than the paper from which the washer W is made, it is not necessary to provide a holding finger to prevent the material from retracting, but instead we use a hook 311 which drops into one of the blanked holes. Movement of bar 306 is obtained from the up and down movement of the cam which drives rod 322 horizontally. We prefer to make the discs of polyethylene, but as stated, other plastic, compressible or rubber-like materials may be used. The material is fed to a die 312 (Fig. 30) in alignment with an upper plunger 314. The upper plunger cuts a circular opening in the strip.

Figure 30:
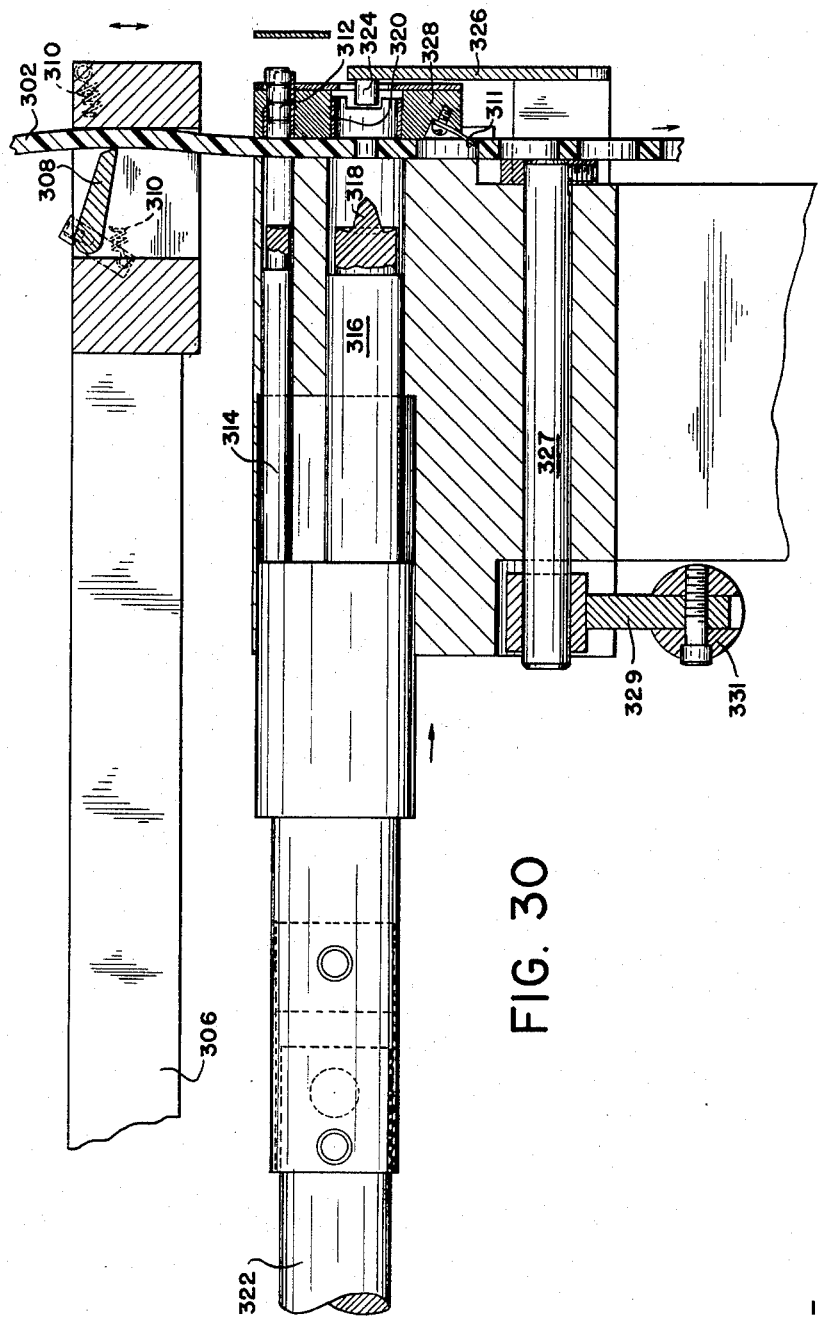
Fig. 30 is a vertical, sectional view of the mechanism for forming the closure disc on line 30—30 of Fig. 23.
Figure 40:
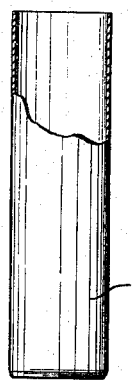

A portion of the strip with a center opening is shown in alignment with lower plunger 316 in Fig. 30. As shown, the plunger has a center portion 318 which is received in the opening when the plunger reciprocates. The plunger forces material into die 320 forming a closure disc D. As each disc is cut from the strip and moved to the right in die 320, it moves a preceding disc ahead of it. The plungers are reciprocated by cam rod 322 (Fig. 23) which is actuated by a cam (not shown) on shaft 50.

When a disc is to the extreme right of die 320 in Fig. 30, it is in a position in which it can be moved by pin 324 carried by pivoted feed arm 326 which is best shown in Fig. 24. A plate 328, in front of the plungers, has a channel or chute 330 to receive the discs D. Reciprocation of arm 326 with the pin pushing one side of the disc moves it toward the left in Fig. 24 and pushes the discs ahead of it in the channel toward the point where they are assembled with the carbon electrodes E.

Assembling of the closure discs D and electrodes E and their insertion in the can is best shown in Figs. 31 to 34.

As shown in Fig. 1, a supply of electrodes E is placed in a hopper 332. A grooved feed roller 334 in the bottom of the hopper feeds the electrodes to a passage 336 (Fig. 24) through which the electrodes progress, one on top of another. Roller 334 is driven intermittently by belt 338 from shaft 48 (Fig. 37), the belt passing over pulleys 340 on shaft 48 and the shaft of the roller. The rate of delivery, or the speed of rotation of roller 334, is calculated to slightly exceed the demand. So that with passage 336 full of electrodes, the foremost electrode in passage 336 is forced into its final position, while any excess movement of roller 334 is prevented by slippage at the belt drive. As shown in Fig. 31, the forward wall 368 of passage 336 extends downwardly to restrain any tendency of the second electrode of the stack to move when the lowermost one is fed through the opening in disc D and into the can by the forward movement of plunger 342.

The mechanism at this station consists of an inner plunger 342 which feeds the electrode E, an intermediate plunger 344 which forces the closure D into the can, and an outer plunger 346 which engages the end of the can and carries the head in which the closure D is compressed. The plungers reciprocate in a block 348 into which the vertical passage 336 extends. The outer plunger has a head 350 which receives the discs from the channel 330 (see Fig. 32). The front section just back of the respective heads of the outer plunger and intermediate plunger are recessed to permit the electrodes to move into alignment with the center plunger.

The can is supported on a pair of arms 352 and held in place by spring loaded roller 40. Pivoted stripper bar 354 is arranged in front of the can. The head 350 has a slot 356 to receive this member which is swung out of the way of the disc, compressing spring 358 as the head moves forward. Figs. 31 and 32 show the plungers in their retracted position ready for the forward operating stroke.

When inner plunger 342, which receives a reciprocating movement from a cam (not shown) on shaft 50, starts its forward movement, it will cause ring 362 to come in contact with shoulder 370 on intermediate plunger 344 at which time ring 363 will also come in contact with a shoulder (not shown) located on the back portion (past the limit of Fig. 32) of plunger 342. When this condition is reached, the pressure of spring 360 urging intermediate plunger 344 and outer plunger 346 to move to the left is relieved and further movement of plunger 342 will cause plunger 344 to move to the right, the thrust being transmitted by ring 362 in contact with ledge 370. This thrust borne by spring 360 is sufficient to make disc D come in contact with shoulder 366, assuring the position of the disc to be at a right angle to the carbon electrode. The continuing movement of plunger 342 will cause both plungers 344 and 346 to move to the right since the disc now transmits the thrust of the intermediate plunger 344 to outer plunger 346. When head 350 of outer plunger 346 comes in contact with the can, further movement of plungers 344 and 346 is prevented and inner plunger 342 will move against the pressure of spring 360, slide the electrode through the opening in disc D and force it into the mix.

As the electrode approaches the bottom of the can, face 365 on plunger 342 engages face 367 on plunger 344. This imparts a positive drive to plunger 344 and the disc is forced over ledge 366 into a funnel-shaped or tapering portion 372 of the bore of head 350. Beyond this section the head has a guiding portion 374 in which the end of the can has been received (Figs. 33 and 34). Disc D is thus moved through portion 372 of the bore compressing it radially and into the end of the can. The can and disc are of such relative size that the disc remains under compression in the can forming a tight seal between the edge of the disc and the inner wall of the can and between the central opening of the disc and the carbon electrode. In Fig. 33 the closure disc is shown passing through the funnel section 372 of the bore of the head, the inner and intermediate plungers moving forward. Fig. 34 shows the parts at the end of the movement with the disc D in its final position in the end of the can.

Figure 23:
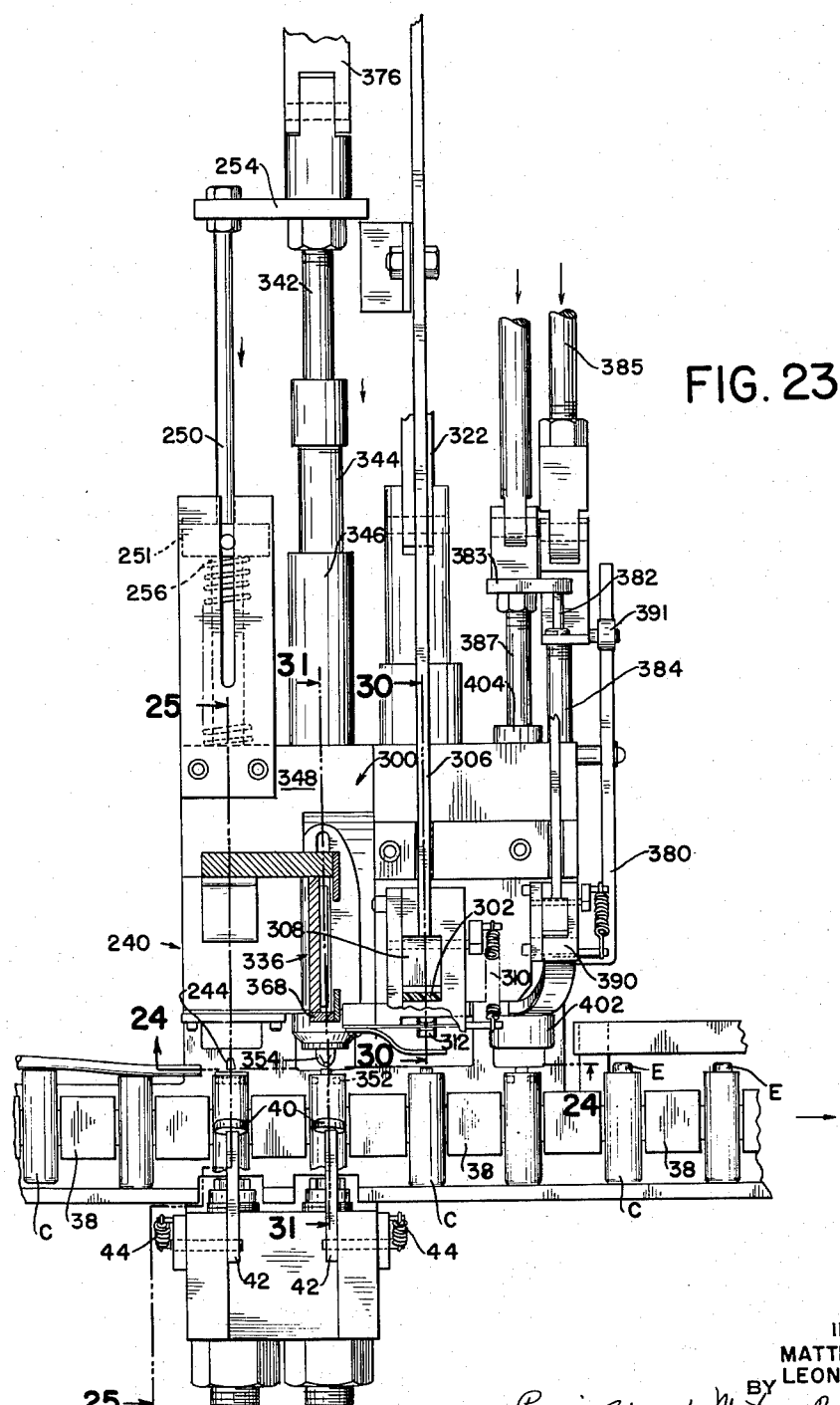
Fig. 23 is a plan view of a series of stations at which the carbon pencil and closure disc are inserted and the brass cap applied.

Referring to Fig. 23, cam rod 376 is reciprocated from shaft 50. The rod 376 reciprocates plunger 342 and movement is transmitted from it to plungers 344 and 346 as heretofore described.

At the last of the stations shown in Fig. 23, a brass contact cap is formed from brass strip and placed on the carbon. The mechanism for forming the cap is shown in detail in Fig. 35. An outer blanking plunger 384 is reciprocated by cam rod 385 which is driven from a cam on shaft 50 (not shown). Inner plunger 382 is reciprocated by plunger 387 through connecting link 383. Brass strip is fed from a reel 388 (Fig. 1). A member 390 (Fig. 24) carries a feeding finger, similar to feeding finger 308, to deliver the strip between the end of the plungers 382, 384 and a die member. Outer plunger 384 first blanks out a piece of the metal against the face 394 of the die. The inner plunger then passes into bore 396 and forms the piece into a cap around the end of the plunger, between it and the walls of the bore. The formed cap at that time hsa its closed end facing the cell can and therefore, must be reversed. We accomplish this by a construction somewhat similar to the mechanism for feeding the closure discs. As shown in Fig. 24, channel 398 is formed on member 400, extending upwardly and over in a substantial semi-circle so that a member passed through the channel will be reversed. The reciprocating lever 380 carries an arm 400 which engages the bottom cap to force all of the caps in the channel toward the outlet end.

Lever 380 is reciprocated by movement of plunger 384 through a roller 391 which engages a sloping portion of the lever on its return stroke.

The outlet end of channel 398 is aligned with the head 402 of an outer plunger 404. Inner plunger 406 is driven by cam rod 108 which is, in turn, driven by a cam (not shown) on shaft 50. Spring 410 is arranged between collar 412 on the inner plunger and a shoulder 414 on the outer plunger. This spring loads plunger 404 to move it forward and bring head 402 against the head of the can. This properly positions the can and the carbon electrode in alignment with inner plunger 406 to receive the cap when the inner plunger continues its forward movement.

Fig. 3 illustrates some of the features of the drive mechanism not heretofore described. A vertical shaft 420 is driven from shaft 50 by worm gears 422 (Fig. 17) adjacent the mix container. Shaft 424 of rotating member 194 is driven from shaft 420 by chain 426 passing over sprockets 428 on the shafts (Fig. 3).

Shaft 48 at the right hand end of the machine, which drives the chain 8, is intermittently driven by a Geneva movement. A shaft 430 extends across the end of the machine parallel to shaft 48. It is driven from shaft 50 by worm gears 432. It carries a disc 434 (Figs. 36 and 37) having a projecting pin 436. This pin enters radial slots 438 in a disc 440 on shaft 48 to form a conventional Geneva drive and impart a step by step movement to shaft 48. A brake 435 (Fig. 2) prevents overrun of the chain, and maintains the operative flight under constant tension. As heretofore stated, one of the pulleys 340, over which belt 338 passes, is on shaft 48 (Fig. 37). The plunger 198 (Figs. 19 and 20) is driven from shaft 50. A cam 442 reciprocates vertical rod 444. This rod is connected to a link 446 pivoted at 448 over the container 192. The other end of link 446 is connected to plunger rod 450.

Disc feeding member 326 is mounted on an oscillating shaft 327. This shaft has an arm 329 connected to link 331. Link 331 is, in turn, connected to a cam 333 on shaft 430 (see Fig. 37).

Referring to Figs. 10 and 11, pin 118 not only serves as a release for arm 104 to interrupt the paper feed at the proper time, but it also functions as means for controlling the length of the cylinder. It is shown as threaded, but any means can be used for adjusting its length to regulate the length of the severed liner.

Referring to Fig. 38 of the drawings, it will be recalled that in the form of the invention shown in Figs. 19 and 20, plunger 198 was sufficiently loose in cavity 192 to permit excess mix to flow around the plunger back into the container 190. A spring loaded plunger 198 snugly fitting the cavity 192 may be employed instead. A spring 454 is arranged over guide 200 surrounding the plunger rod 456 and confined between the top of the guide and collar 458 on the rod. When the mix has been compacted in the can to the degree for which the spring is set, further application of force to the plunger rod is taken up in the compression of the spring.

Another method of accomplishing the same result is shown in Fig. 39. A by-pass formed by tube 460 extends from the mouth of nozzle 202 outwardly through the nozzle into the bottom of container 190. When material is delivered to the can through the nozzle, any excess is returned to the container through tube 460.

Figure 42:
Figure 43:
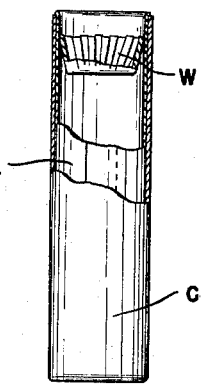

Figs. 40 to 50, inclusive, illustrate the can or cell in its various steps of manufacture. Thus the can C (Fig. 40) is shown as cylindrical, although it may be of other shapes, and dry cells of oval, or rectangular cross-section are by no means rare or uncommon. The shape shown is therefore for illustration only. As heretofore described, a liner L is first inserted in the can with its lower edge spaced from the bottom of the can (Fig. 41). Fig. 42 illustrates the step of moving the liner downwardly into the can until it reaches the bottom, and slightly flaring its upper edge. In Fig. 43, the cup washer W has been inserted in the upper portion of the can. It will be noted how the flared side wall of this washer contacts the liner and this produces the pressure to move the liner into close contact with the can walls.

Figure 44:
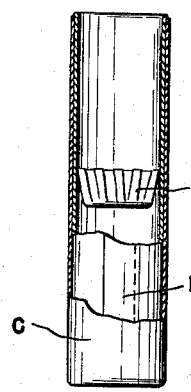
Figure 45:
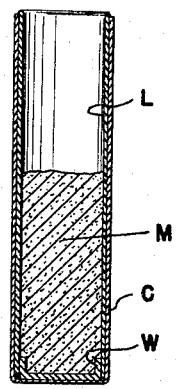
Figure 46:
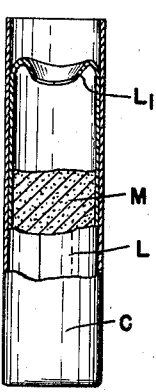
Figure 47:
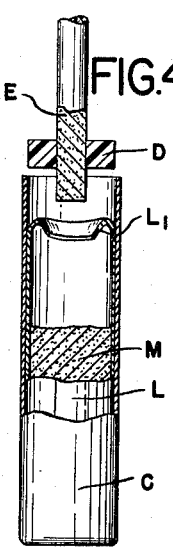
Figure 48:
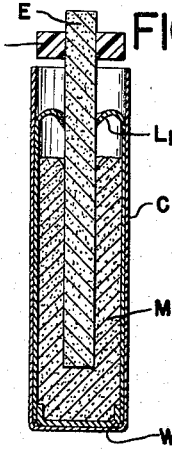
Figure 49:
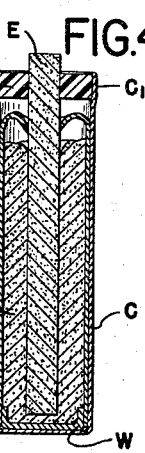
Figure 50:
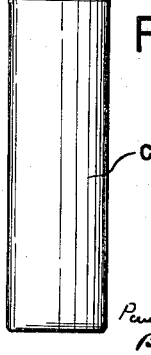

The cup washer is moved to the position shown in Fig. 44 when the can is fed over the extruder nozzle. As it moves downwardly in the can, its side walls exert pressure on the portion of the liner over which it passes to spread the liner and create close contact between it and the can. The mix is then delivered to the can, as indicated in Fig. 45, moving cup washer W to the bottom of the can to function as a bottom washer. Fig. 46 illustrates the cell after the upper edge L' of the liner has been turned over to make room for the closure disc. Fig. 47 illustrates an electrode E and a closure disc D assembled and about to be fed to the can. With the disc D retained in head 350, the electrode E is forced through the mix M to a position just short of its ultimate position, as shown in Fig. 48. From that point, the electrode E and disk D move together, the intermediate plunger at the station when this operation is performed being then driven. The electrode and disc are moved to their final position illustrated in Fig. 49, the disc being compressed as indicated. In actual practice, the parts are of such size that the upper edge C' of the can is slightly bulged when the disc is forced into it. Securing the brass cap B to the end of electrode E then completes the cell, as shown in Fig. 50.

We claim:

1. Means for forming a paper liner and inserting it in a dry cell can comprising means for locating and supporting the can, a supply of paper, a cylinder forming cone in alignment with the can support, a reciprocating cylindrical member between the forming cone and the can, a reciprocating frame adjacent the cylinder, locking means carried by the frame to retain the formed paper cylinder in engagement with the cylindrical member to feed the paper when the frame and cylindrical member are reciprocated, and means for severing liners from the forward end of the paper cylinder.

2. Means for forming a paper liner and inserting it in a dry cell can comprising means for supporting the can, a supply of paper, a cylinder forming cone in alignment with the can support, a reciprocating cylindrical member between the forming cone and the can, a reciprocating frame adjacent the cylinder, locking means carried by the frame to retain the former paper cylinder in engagement with the cylindrical member to feed the paper when the frame and cylindrical member are reciprocated, a stationary severing die member in alignment with the cylindrical member, and a die member carried by the frame and movable over the stationary die member to sever a liner from the forward end of the paper cylinder.

3. Means for delivering predetermined amounts of depolarizing mix to cell cans comprising a container for the mix, the container having a chamber of greater capacity than the amount of mix to be delivered to each can, means for periodically delivering the mix from the container to the chamber, a plunger in the chamber, an extruder nozzle communicating with the chamber, the nozzle having a diameter substantially equal to the diameter of the can, means for positioning the nozzle at a predetermined point within the can, the nozzle snugly fitting in the can to confine the mix to the portion of the can between the bottom of the can and the nozzle, and means to reciprocatae the plunger and to control the compression of the mix in the can.

4. Means for delivering predetermined amounts of depolarizing mix to cell cans comprising a container for the mix, the container having a chamber of greater capacity than the amount of mix to be delivered to each can, means for periodically delivering the mix from the container to the chamber, a plunger in the chamber, an extruder nozzle communicating with the chamber, the nozzle having a diameter substantially equal to the diameter of the can, means for positioning the nozzle at a predetermined point within the can, the nozzle snugly fitting in the can to confine the mix to the portion of the can between the bottom of the can and the nozzle, and means for reciprocating the plunger, the plunger being spring loaded to control the compression of the mix in the can.

5. Means for inserting a carbon electrode and a closure disc in a dry cell can containing depolarizing mix comprising a die, means for feeding the closure disc material in strip form to the die means for cutting discs and forming central openings in them, a container for the electrodes, means for feeding an electrode into axial alignment with a formed closure disc, means for moving the carbon electrode axially through the central opening of the disc into the depolarizing mix of a cell, and additional means for moving the disc and electrode as a unit into the cell and compressing the disc as it enters the end of the cell can.

6. The method of making a dry cell which comprises placing a liner in the cell can covering the walls of the can, placing a cup washer having an appreciable springiness in its walls in the mouth of the can, introducing a nozzle into the end of the can, the nozzle engaging the edge of the side walls of the cup washer to move it downwardly in the can and cause the liner to adhere closely to the can walls, the nozzle being inserted in the can a predetermined distance, the nozzle substantially filling the portion of the can in which it is received and having a central bore of a diameter substantially equal to the internal diameter of the can whereby mix delivered into the can from the nozzle will be confined to the space between the nozzle and the bottom of the can, and applying pressure to the mix in the bore of the nozzle to deliver mix into the can to fill the space between the nozzle and the bottom of the can, whereby the mix moves the cup washer to the bottom of the cell to form a bottom washer and the side walls of the washer force the remainder of the liner into close contact with the walls of the cell as it moves to the bottom of the can.

7. In the method of making dry cells, the steps comprising inserting a paper cylinder into a cell can to form a liner in contact with the walls of the can, inserting a cup washer having a bottom and a cylindrical wall in the liner at a point near the top edge of the liner, delivering a predetermined amount of depolarizing mix into the can, and applying pressure to it to force it to the bottom of the can, the mix forcing the cup washer to the bottom of the cell to separate the bottom of the cell can from the mix.

8. In the manufacture of a cell of the type including a metallic casing having a base and a body terminating in an open end, the steps of inserting a cylindrical liner endwise into the open end of said metallic casing into substantial coextensive relation with said body, disposing a spreading member within said liner adjacent to and bridging said open end of said metallic casing, and delivering a charge of a depolarizing mix through the open end of said metallic casing whereby said spreading member is advanced into co-extensive relation with said base by movement of said charge into the casing, said charge filling said liner from said base to a location spaced from said open end and said liner and said spreading member serving to separate said charge from said metallic casing.

9. In the manufacture of a cell of the type including a metallic casing having a base and a body terminating in an open end, the steps of inserting a cylindrical liner endwise into the open end of said metallic casing, disposing a cup-shaped springy member within said metallic casing adjacent to said open end, said cup-shaped member exerting a spreading force on said liner urging the liner into close contact with said metallic casing, and delivering a charge of a depolarizing mix through the open end of said metallic casing and into said liner whereby said springy member is advanced along the length of said liner and continuously exerts a spreading force on said liner until said springy member is advanced into contact with said base.

10. In the manufacture of a cell of the type including a metallic casing having a base and a body terminating in an open end, the steps of inserting a liner into said metallic casing, delivering a charge of depolarizer mix through the open end of said metallic casing to form a compact mass within said liner, filling said metallic casing from said base to a location spaced from said open end, arranging an electrode for endwise advance into said metallic casing with an insulating member on said electrode adjacent its forward end, advancing said electrode relative to said insulating member and endwise into said casing with said insulating member serving as an aligning fixture for said electrode, and continuing said endwise advance until said electrode penetrates into said compact to a predetermined extent.

11. In the manufacture of a cell of the type including a metallic casing having a base and a body terminating in an open end, the steps of inserting a liner endwise into the open end of said metallic casing into substantial coextensive relation with said body, disposing a spreading member within said metallic casing adjacent to and bridging said open end, delivering a charge of a depolarizer mix through the open end of said metallic casing whereby said spreading member is advanced against said base, said liner and spreading member serving to separate said charge from said metallic casing, arranging an electrode for endwise advance into said metallic casing with an insulating member on said electrode adjacent its forward end, advancing said electrode endwise into said casing with said insulating member serving as an aligning fixture for said electrode, and continuing said endwise advance until said electrode penetrates into said mix to a predetermined extent.

12. In the manufacture of a cell of the type including a metallic casing having a base and a body terminating in an open end, the steps of inserting a liner into said metallic casing, delivering a charge of depolarizer mix through the open end of said metallic casing to form a compact mass within said liner, filling in said metallic casing from said base to a location spaced from said open end, arranging an electrode for endwise advance into said metallic casing with an insulating member on said electrode adjacent its forward end, advancing said electrode relative to said insulating member and endwise into said casing with said insulating member serving as an aligning fixture for said electrode, continuing said endwise advance until said electrode penetrates into said compact to a predetermined extent, and advancing said insulating member into the open end of said casing to maintain the relative alignment between said electrode and said casing.

13. In the manufacture of a cell of the type including a cylindrical casing having a base and a body terminating in an open mouth, the method of forming a liner from a length of separator material for said casing including advancing said strip lengthwise toward the open end of said casing, turning in the opposite margins of said strip into overlapping relation whereby said strip is formed into a liner of a section complementary to the section of said casing, continuing said endwise advance until a leading section of said liner enters said casing with its leading end terminating short of said base, and cutting off said leading section of said liner at a location spaced from said open end of said casing as determined by spacing of said leading end of said leading section from said base of said casing, and imparting a final thrust to said leading section of said liner whereby the same is advanced into its final position.

14. In the manufacture of a cell of the type including a cylindrical casing having a base and a body terminating in an open mouth, the method of forming a liner from a length of separator material for said casing including advancing said strip lengthwise toward the open end of said casing, turning in the opposite margins of said strip into overlapping relation whereby said strip is formed into a liner of a section complementary to the section of said casing, continuing said endwise advance until a leading section of said liner enters said casing with its leading end terminating short of said base, and cutting off said leading section of said liner at a location spaced from said open end of said casing as determined by spacing of said leading end of said leading section from said base of said casing, imparting a final thrust to said leading section of said liner whereby the same is advanced into its final position, and imparting an outward flare to the trailing end of the cut-off section during said final thrust.

15. In the manufacture of a cell of the type including a cylindrical casing having a base and a body terminating in an open mouth, the method of forming a liner from a length of separator material for said casing including advancing said strip lengthwise toward the open end of said casing, turning in the opposite margins of said strip into overlapping relation whereby said strip is formed into a cylindrical liner, continuing said endwise advance until a leading section of said liner enters said casing with its leading end terminating short of said base, and cutting off said leading section of said liner at a location spaced from said open end of said casing as determined by spacing of said leading end of said leading section from said base of said casing, and imparting a final thrust to said leading section of said liner whereby the same is advanced into its final position.

16. Apparatus for forming a liner for a dry cell comprising a support for the cell, a cylinder forming member in axial alignment with the support, a reciprocating frame to receive the cylinder and pull it through the cylinder forming member and into the can, and means to sever a portion of the formed cylinder after it has been partially inserted into the can.

17. Means for inserting a carbon electrode and a closure disc in a dry cell can containing depolarizing mix comprising a container for the electrodes, means for feeding an electrode into axial alignment with a formed closure disc, means for moving the carbon electrode axially through the central opening of the disc into the depolarizing mix of a cell, and additional means for moving the disc and electrode as a unit into the cell and compressing the disc as it enters the end of the cell can.

18. The method of delivering depolarizing mix to dry cell cans which comprises positioning an extruder nozzle at a predetermined position from the bottom of the can, the exterior diameter of the nozzle and the interior diameter of the can being such that insufficient clearance is provided between the nozzle and can to substantially prevent escape of any mix from the can, the nozzle being provided with a bore substantially equal to the internal diameter of the can, and feeding a slug of depolarizing mix into the can and consolidating it in the can by applying a predetermined pressure to the mix within the nozzle, and permitting escape of excess material rearwardly of the nozzle when the mix has been compacted to the desired point.

19. The method of delivering depolarizing mix into a dry cell can which comprises positioning a delivery member in the can a predetermined distance from the bottom of a can to create a space of a given capacity to receive the mix, delivering a slug of mix of substantially the same cross-sectional area as that of the can into the can under predetermined pressure, substantially preventing escape of any material from the can, and permitting escape of excess material rearwardly through the delivery member when the mix in the can has been compacted to the desired point.

References Cited in the file of this patent

UNITED STATES PATENTS

| Number | Name | Date |
|---|---|---|
| 223,522 | Locke | Jan. 13, 1880 |
| 987,876 | Harmon | Mar. 8, 1911 |
| 1,173,763 | Baker | Feb. 29, 1916 |
| 1,210,577 | Williams | Jan. 2, 1917 |
| 1,302,304 | Burgess | Apr. 29, 1919 |
| 1,361,499 | Ruhoff | Dec. 7, 1920 |
| 1,497,316 | Askin | June 10, 1924 |
| 1,570,916 | De Olaneta | Jan. 26, 1926 |
| 1,669,054 | Hodge | May 8, 1928 |
| 1,874,748 | Henderson | Aug. 30, 1932 |
| 2,144,628 | Hothersall | Jan. 24, 1939 |
| 2,246,043 | Heinmets | June 17, 1941 |
| 2,428,098 | Schmidt | Sept. 20, 1947 |
| 2,604,258 | Murnane et al. | July 22, 1952 |
| 2,699,246 | Harrison et al. | Jan. 11, 1955 |
| 2,708,242 | Ruben | May 10, 1955 |
| 2,752,028 | Moskowitz et al. | June 26, 1956 |
| 2,774,203 | Smathers | Dec. 18, 1956 |
| 2,794,060 | McFarland | May 28, 1957 |
| 2,802,042 | Anthony et al. | Aug. 6, 1957 |